US011856271B2

(12) United States Patent
Bloch et al.

(10) Patent No.: US 11,856,271 B2
(45) Date of Patent: Dec. 26, 2023

(54) SYMBIOTIC INTERACTIVE VIDEO

(71) Applicant: JBF Interlude 2009 LTD, Tel Aviv-Jaffa (IL)

(72) Inventors: Jonathan Bloch, Brooklyn, NY (US); Barak Feldman, Tenafly, NJ (US); Tal Zubalsky, Brooklyn, NY (US); Yuval Hofshy, Kfar Saba (IL); Alon Benari, Brooklyn, NY (US)

(73) Assignee: JBF Interlude 2009 LTD, Tel Aviv (IL)

(*) Notice: Subject to any disclaimer, the term of this patent is extended or adjusted under 35 U.S.C. 154(b) by 0 days.

(21) Appl. No.: 15/165,373

(22) Filed: May 26, 2016

(65) Prior Publication Data

US 2017/0295410 A1 Oct. 12, 2017

Related U.S. Application Data

(60) Provisional application No. 62/321,482, filed on Apr. 12, 2016.

(51) Int. Cl.
*H04N 5/445* (2011.01)
*H04N 21/81* (2011.01)
(Continued)

(52) U.S. Cl.
CPC ..... *H04N 21/812* (2013.01); *H04N 21/23424* (2013.01); *H04N 21/4524* (2013.01); *H04N 21/482* (2013.01); *H04N 21/6125* (2013.01)

(58) Field of Classification Search
CPC .. H04N 21/812; H04N 21/235; H04N 21/435; H04N 21/4331; H04N 21/4532;
(Continued)

(56) References Cited

U.S. PATENT DOCUMENTS 4,569,026 A 2/1986 Best
5,137,277 A 8/1992 Kitaue
(Continued)

FOREIGN PATENT DOCUMENTS

CA 2639491 A1 3/2010
DE 004038801 A1 6/1992
(Continued)

OTHER PUBLICATIONS

An ffmpeg and SDL Tutorial, "Tutorial 05: Synching Video," Retrieved from Internet on Mar. 15, 2013: <http://dranger.com/ffmpeg/tutorial05.html>, (4 pages).
(Continued)

*Primary Examiner* — Annan Q Shang
(74) *Attorney, Agent, or Firm* — Goodwin Procter LLP

(57) ABSTRACT

In a method and accompanying system for providing symbiotic media content, one or more advertising units comprising advertising video content are received at a user device. During the playback of primary video content to a user of the device, a plurality of user interface controls are displayed, with each control being associated with a respective advertising unit. On receiving an interaction with one of the controls, the primary video content is combined with the advertisement associated with the selected control, forming a symbiotic video. The symbiotic video is presented to the user and, on completion thereof, playback of the primary video content is continued.

22 Claims, 6 Drawing Sheets

(51) Int. Cl.
*H04N 21/61* (2011.01)
*H04N 21/234* (2011.01)
*H04N 21/482* (2011.01)
*H04N 21/45* (2011.01)

(58) Field of Classification Search
CPC ......... H04N 21/6125; H04N 21/23424; H04N 21/482; H04N 21/4524; H04N 21/25883; H04N 21/472; H04N 21/4316; H04N 21/25841; H04N 21/25891
USPC .............................................. 725/32, 33, 34
See application file for complete search history.

(56) References Cited

U.S. PATENT DOCUMENTS

| | | | |
|---|---|---|---|
| 5,161,034 A | 11/1992 | Klappert | |
| 5,568,602 A | 10/1996 | Callahan et al. | |
| 5,568,603 A | 10/1996 | Chen et al. | |
| 5,597,312 A | 1/1997 | Bloom et al. | |
| 5,607,356 A | 3/1997 | Schwartz | |
| 5,610,653 A | 3/1997 | Abecassis | |
| 5,636,036 A | 6/1997 | Ashbey | |
| 5,676,551 A | 10/1997 | Knight et al. | |
| 5,694,163 A * | 12/1997 | Harrison | H04N 21/6137 725/110 |
| 5,715,169 A | 2/1998 | Noguchi | |
| 5,734,862 A | 3/1998 | Kulas | |
| 5,737,527 A | 4/1998 | Shiels et al. | |
| 5,745,738 A | 4/1998 | Ricard | |
| 5,751,953 A | 5/1998 | Shiels et al. | |
| 5,754,770 A | 5/1998 | Shiels et al. | |
| 5,818,435 A | 10/1998 | Kozuka et al. | |
| 5,848,934 A | 12/1998 | Shiels et al. | |
| 5,887,110 A | 3/1999 | Sakamoto et al. | |
| 5,894,320 A | 4/1999 | Vancelette | |
| 5,956,037 A | 9/1999 | Osawa et al. | |
| 5,966,121 A | 10/1999 | Hubbell et al. | |
| 5,983,190 A | 11/1999 | Trower, II et al. | |
| 6,067,400 A | 5/2000 | Saeki et al. | |
| 6,091,886 A | 7/2000 | Abecassis | |
| 6,122,668 A | 9/2000 | Teng et al. | |
| 6,128,712 A | 10/2000 | Hunt et al. | |
| 6,191,780 B1 | 2/2001 | Martin et al. | |
| 6,222,925 B1 | 4/2001 | Shiels et al. | |
| 6,240,555 B1 * | 5/2001 | Shoff | H04N 5/44543 348/E5.104 |
| 6,298,020 B1 | 10/2001 | Kumagami | |
| 6,298,482 B1 | 10/2001 | Seidman et al. | |
| 6,460,036 B1 | 10/2002 | Herz | |
| 6,535,639 B1 | 3/2003 | Uchihachi et al. | |
| 6,657,906 B2 * | 12/2003 | Martin | G11C 7/1051 365/181 |
| 6,698,020 B1 * | 2/2004 | Zigmond | H04N 5/44513 348/E5.102 |
| 6,728,477 B1 | 4/2004 | Watkins | |
| 6,771,875 B1 | 8/2004 | Kunieda et al. | |
| 6,801,947 B1 | 10/2004 | Li | |
| 6,947,966 B1 | 9/2005 | Oko, Jr. et al. | |
| 7,085,844 B2 | 8/2006 | Thompson | |
| 7,155,676 B2 | 12/2006 | Land et al. | |
| 7,231,132 B1 | 6/2007 | Davenport | |
| 7,296,231 B2 | 11/2007 | Loui et al. | |
| 7,310,784 B1 | 12/2007 | Gottlieb et al. | |
| 7,319,780 B2 | 1/2008 | Fedorovskaya et al. | |
| 7,379,653 B2 | 5/2008 | Yap et al. | |
| 7,430,360 B2 | 9/2008 | Abecassis | |
| 7,444,069 B1 | 10/2008 | Bernsley | |
| 7,472,910 B1 | 1/2009 | Okada et al. | |
| 7,627,605 B1 | 12/2009 | Lamere et al. | |
| 7,650,623 B2 | 1/2010 | Hudgeons et al. | |
| 7,669,128 B2 | 2/2010 | Bailey et al. | |
| 7,694,320 B1 | 4/2010 | Yeo et al. | |
| 7,779,438 B2 * | 8/2010 | Davies | H04N 5/783 725/135 |
| 7,787,973 B2 | 8/2010 | Lambert | |
| 7,917,505 B2 | 3/2011 | van Gent et al. | |
| 8,024,762 B2 | 9/2011 | Britt | |
| 8,046,801 B2 | 10/2011 | Ellis et al. | |
| 8,065,710 B2 | 11/2011 | Malik | |
| 8,151,139 B1 | 4/2012 | Gordon | |
| 8,176,425 B2 | 5/2012 | Wallace et al. | |
| 8,190,001 B2 | 5/2012 | Bernsley | |
| 8,202,167 B2 | 6/2012 | Ackley et al. | |
| 8,276,058 B2 | 9/2012 | Gottlieb et al. | |
| 8,281,355 B1 | 10/2012 | Weaver et al. | |
| 8,321,905 B1 | 11/2012 | Streeter et al. | |
| 8,341,662 B1 | 12/2012 | Bassett et al. | |
| 8,350,908 B2 | 1/2013 | Morris et al. | |
| 8,405,706 B2 | 3/2013 | Zhang et al. | |
| 8,600,220 B2 | 12/2013 | Bloch et al. | |
| 8,612,517 B1 | 12/2013 | Yadid et al. | |
| 8,626,337 B2 | 1/2014 | Corak et al. | |
| 8,646,020 B2 | 2/2014 | Reisman | |
| 8,650,489 B1 | 2/2014 | Baum et al. | |
| 8,667,395 B2 | 3/2014 | Hosogai et al. | |
| 8,750,682 B1 | 6/2014 | Nicksay et al. | |
| 8,752,087 B2 * | 6/2014 | Begeja | G06Q 30/02 725/34 |
| 8,826,337 B2 | 9/2014 | Issa et al. | |
| 8,860,882 B2 | 10/2014 | Bloch et al. | |
| 8,930,975 B2 | 1/2015 | Woods et al. | |
| 8,977,113 B1 | 3/2015 | Rumteen et al. | |
| 9,009,619 B2 | 4/2015 | Bloch et al. | |
| 9,021,537 B2 | 4/2015 | Funge et al. | |
| 9,082,092 B1 | 7/2015 | Henry | |
| 9,094,718 B2 | 7/2015 | Barton et al. | |
| 9,190,110 B2 | 11/2015 | Bloch | |
| 9,257,148 B2 | 2/2016 | Bloch et al. | |
| 9,268,774 B2 | 2/2016 | Kim et al. | |
| 9,271,015 B2 | 2/2016 | Bloch et al. | |
| 9,313,536 B1 * | 4/2016 | Killick | H04N 21/26258 |
| 9,363,464 B2 | 6/2016 | Alexander | |
| 9,367,196 B1 | 6/2016 | Goldstein et al. | |
| 9,374,411 B1 | 6/2016 | Goetz | |
| 9,380,326 B1 * | 6/2016 | Corley | H04L 65/75 |
| 9,390,099 B1 | 7/2016 | Wang et al. | |
| 9,456,247 B1 | 9/2016 | Pontual et al. | |
| 9,465,435 B1 | 10/2016 | Zhang et al. | |
| 9,473,582 B1 | 10/2016 | Fraccaroli | |
| 9,497,496 B1 * | 11/2016 | Corley | H04N 21/2225 |
| 9,510,044 B1 | 11/2016 | Pereira et al. | |
| 9,520,155 B2 | 12/2016 | Bloch et al. | |
| 9,530,454 B2 | 12/2016 | Bloch et al. | |
| 9,531,998 B1 | 12/2016 | Farrell et al. | |
| 9,538,219 B2 | 1/2017 | Sakata et al. | |
| 9,554,061 B1 * | 1/2017 | Proctor, Jr. | H04N 21/43615 |
| 9,571,877 B2 | 2/2017 | Lee et al. | |
| 9,607,655 B2 | 3/2017 | Bloch et al. | |
| 9,641,898 B2 | 5/2017 | Bloch et al. | |
| 9,653,115 B2 | 5/2017 | Bloch et al. | |
| 9,653,116 B2 | 5/2017 | Paulraj et al. | |
| 9,672,868 B2 | 6/2017 | Bloch et al. | |
| 9,715,901 B1 | 7/2017 | Singh et al. | |
| 9,736,503 B1 | 8/2017 | Bakshi et al. | |
| 9,792,026 B2 | 10/2017 | Bloch et al. | |
| 9,792,957 B2 | 10/2017 | Bloch et al. | |
| 9,826,285 B1 | 11/2017 | Mishra et al. | |
| 9,967,621 B2 | 5/2018 | Armstrong et al. | |
| 10,070,192 B2 | 9/2018 | Baratz | |
| 10,178,304 B1 | 1/2019 | Tudor et al. | |
| 10,178,421 B2 | 1/2019 | Thomas et al. | |
| 10,187,687 B2 | 1/2019 | Harb et al. | |
| 10,194,189 B1 | 1/2019 | Goetz et al. | |
| 10,257,572 B2 | 4/2019 | Manus et al. | |
| 10,257,578 B1 | 4/2019 | Bloch et al. | |
| 10,310,697 B2 | 6/2019 | Roberts et al. | |
| 10,419,790 B2 | 9/2019 | Gersten | |
| 10,460,765 B2 | 10/2019 | Bloch et al. | |
| 10,523,982 B2 | 12/2019 | Oyman | |
| 10,771,824 B1 * | 9/2020 | Haritaoglu | H04N 21/6373 |
| 10,856,049 B2 | 12/2020 | Bloch et al. | |
| 11,003,748 B2 | 5/2021 | Oliker et al. | |
| 2001/0056427 A1 | 12/2001 | Yoon et al. | |

(56) References Cited

U.S. PATENT DOCUMENTS

| | | |
|---|---|---|
| 2002/0019799 A1 | 2/2002 | Ginsberg et al. |
| 2002/0029218 A1 | 3/2002 | Bentley et al. |
| 2002/0053089 A1 | 5/2002 | Massey |
| 2002/0086724 A1 | 7/2002 | Miyaki et al. |
| 2002/0089523 A1 | 7/2002 | Hodgkinson |
| 2002/0091455 A1 | 7/2002 | Williams |
| 2002/0105535 A1 | 8/2002 | Wallace et al. |
| 2002/0106191 A1 | 8/2002 | Betz et al. |
| 2002/0120456 A1 | 8/2002 | Berg et al. |
| 2002/0120931 A1 | 8/2002 | Huber et al. |
| 2002/0124250 A1 | 9/2002 | Proehl et al. |
| 2002/0129374 A1 | 9/2002 | Freeman et al. |
| 2002/0140719 A1 | 10/2002 | Amir et al. |
| 2002/0144262 A1* | 10/2002 | Plotnick ............... G11B 27/005 725/32 |
| 2002/0174430 A1 | 11/2002 | Ellis et al. |
| 2002/0177914 A1 | 11/2002 | Chase |
| 2002/0194595 A1 | 12/2002 | Miller et al. |
| 2003/0007560 A1 | 1/2003 | Mayhew et al. |
| 2003/0012409 A1* | 1/2003 | Overton ................... G06T 7/60 382/103 |
| 2003/0020744 A1 | 1/2003 | Ellis et al. |
| 2003/0023757 A1 | 1/2003 | Ishioka et al. |
| 2003/0039471 A1 | 2/2003 | Hashimoto |
| 2003/0069057 A1 | 4/2003 | Defrees-Parrott |
| 2003/0076347 A1* | 4/2003 | Barrett ................... H04N 7/163 715/719 |
| 2003/0101164 A1 | 5/2003 | Pic et al. |
| 2003/0148806 A1 | 8/2003 | Weiss |
| 2003/0159566 A1 | 8/2003 | Sater et al. |
| 2003/0183064 A1 | 10/2003 | Eugene et al. |
| 2003/0184598 A1 | 10/2003 | Graham |
| 2003/0221541 A1 | 12/2003 | Platt |
| 2004/0009813 A1 | 1/2004 | Wind |
| 2004/0019905 A1 | 1/2004 | Fellenstein et al. |
| 2004/0034711 A1 | 2/2004 | Hughes |
| 2004/0070595 A1 | 4/2004 | Atlas et al. |
| 2004/0091848 A1 | 5/2004 | Nemitz |
| 2004/0125124 A1 | 7/2004 | Kim et al. |
| 2004/0128317 A1 | 7/2004 | Sull et al. |
| 2004/0138948 A1 | 7/2004 | Loomis |
| 2004/0146275 A1 | 7/2004 | Takata et al. |
| 2004/0172476 A1 | 9/2004 | Chapweske |
| 2004/0194128 A1* | 9/2004 | Mcintyre ............... H04N 5/272 725/32 |
| 2004/0194131 A1* | 9/2004 | Ellis ................... H04N 5/44543 725/34 |
| 2004/0199923 A1* | 10/2004 | Russek ................. G06Q 30/00 719/310 |
| 2004/0261127 A1 | 12/2004 | Freeman et al. |
| 2005/0019015 A1 | 1/2005 | Ackley et al. |
| 2005/0028193 A1 | 2/2005 | Candelore et al. |
| 2005/0055377 A1 | 3/2005 | Dorey et al. |
| 2005/0091597 A1 | 4/2005 | Ackley |
| 2005/0102707 A1 | 5/2005 | Schnitman |
| 2005/0107159 A1 | 5/2005 | Sato |
| 2005/0120389 A1 | 6/2005 | Boss et al. |
| 2005/0132401 A1 | 6/2005 | Boccon-Gibod et al. |
| 2005/0166224 A1* | 7/2005 | Ficco ................... H04H 20/106 725/35 |
| 2005/0198661 A1 | 9/2005 | Collins et al. |
| 2005/0210145 A1 | 9/2005 | Kim et al. |
| 2005/0240955 A1 | 10/2005 | Hudson |
| 2005/0251820 A1* | 11/2005 | Stefanik ................. H04N 5/445 725/34 |
| 2005/0251827 A1 | 11/2005 | Ellis et al. |
| 2005/0289582 A1 | 12/2005 | Tavares et al. |
| 2006/0002895 A1 | 1/2006 | McDonnell et al. |
| 2006/0024034 A1 | 2/2006 | Filo et al. |
| 2006/0028951 A1 | 2/2006 | Tozun et al. |
| 2006/0064733 A1 | 3/2006 | Norton et al. |
| 2006/0080167 A1* | 4/2006 | Chen ..................... G06Q 30/02 705/14.68 |
| 2006/0089843 A1 | 4/2006 | Flather |
| 2006/0120624 A1 | 6/2006 | Jojic et al. |
| 2006/0130121 A1 | 6/2006 | Candelore et al. |
| 2006/0150072 A1 | 7/2006 | Salvucci |
| 2006/0150216 A1 | 7/2006 | Herz et al. |
| 2006/0153537 A1 | 7/2006 | Kaneko et al. |
| 2006/0155400 A1 | 7/2006 | Loomis |
| 2006/0200842 A1 | 9/2006 | Chapman et al. |
| 2006/0212904 A1 | 9/2006 | Klarfeld et al. |
| 2006/0222322 A1 | 10/2006 | Levitan |
| 2006/0224260 A1 | 10/2006 | Hicken et al. |
| 2006/0253330 A1 | 11/2006 | Maggio et al. |
| 2006/0274828 A1 | 12/2006 | Siemens et al. |
| 2007/0003149 A1 | 1/2007 | Nagumo et al. |
| 2007/0018980 A1 | 1/2007 | Berteig et al. |
| 2007/0024706 A1 | 2/2007 | Brannon et al. |
| 2007/0028272 A1 | 2/2007 | Lockton |
| 2007/0033633 A1 | 2/2007 | Andrews et al. |
| 2007/0055989 A1 | 3/2007 | Shanks et al. |
| 2007/0079325 A1 | 4/2007 | de Heer |
| 2007/0085759 A1 | 4/2007 | Lee et al. |
| 2007/0099684 A1 | 5/2007 | Butterworth |
| 2007/0101369 A1 | 5/2007 | Dolph |
| 2007/0118801 A1 | 5/2007 | Harshbarger et al. |
| 2007/0154169 A1 | 7/2007 | Cordray et al. |
| 2007/0157234 A1 | 7/2007 | Walker |
| 2007/0157260 A1 | 7/2007 | Walker |
| 2007/0157261 A1 | 7/2007 | Steelberg et al. |
| 2007/0162395 A1 | 7/2007 | Ben-Yaacov et al. |
| 2007/0180488 A1 | 8/2007 | Walter et al. |
| 2007/0220583 A1 | 9/2007 | Bailey et al. |
| 2007/0226761 A1* | 9/2007 | Zalewski ............... G06Q 30/02 725/32 |
| 2007/0239754 A1 | 10/2007 | Schnitman |
| 2007/0253677 A1 | 11/2007 | Wang |
| 2007/0253688 A1 | 11/2007 | Koennecke |
| 2007/0263722 A1 | 11/2007 | Fukuzawa |
| 2008/0001956 A1 | 1/2008 | Markovic et al. |
| 2008/0019445 A1 | 1/2008 | Aono et al. |
| 2008/0021187 A1 | 1/2008 | Wescott et al. |
| 2008/0021874 A1 | 1/2008 | Dahl et al. |
| 2008/0022320 A1 | 1/2008 | Ver Steeg |
| 2008/0031595 A1 | 2/2008 | Cho |
| 2008/0086456 A1 | 4/2008 | Rasanen et al. |
| 2008/0086754 A1 | 4/2008 | Chen et al. |
| 2008/0091721 A1 | 4/2008 | Harboe et al. |
| 2008/0092159 A1 | 4/2008 | Dmitriev et al. |
| 2008/0139301 A1 | 6/2008 | Holthe |
| 2008/0148152 A1 | 6/2008 | Blinnikka et al. |
| 2008/0161111 A1 | 7/2008 | Schuman |
| 2008/0170687 A1 | 7/2008 | Moors et al. |
| 2008/0177893 A1 | 7/2008 | Bowra et al. |
| 2008/0178232 A1 | 7/2008 | Velusamy |
| 2008/0238938 A1 | 10/2008 | Eklund et al. |
| 2008/0276157 A1 | 11/2008 | Kustka et al. |
| 2008/0300967 A1 | 12/2008 | Buckley et al. |
| 2008/0301750 A1 | 12/2008 | Silfvast et al. |
| 2008/0314232 A1 | 12/2008 | Hansson et al. |
| 2009/0022015 A1 | 1/2009 | Harrison |
| 2009/0022165 A1 | 1/2009 | Candelore et al. |
| 2009/0024923 A1 | 1/2009 | Hartwig et al. |
| 2009/0027337 A1 | 1/2009 | Hildreth |
| 2009/0029771 A1 | 1/2009 | Donahue |
| 2009/0055880 A1 | 2/2009 | Batteram et al. |
| 2009/0063681 A1 | 3/2009 | Ramakrishnan et al. |
| 2009/0063995 A1 | 3/2009 | Baron et al. |
| 2009/0077137 A1 | 3/2009 | Weda et al. |
| 2009/0079663 A1* | 3/2009 | Chang ................... G06F 3/1462 345/1.2 |
| 2009/0083631 A1 | 3/2009 | Sidi et al. |
| 2009/0116817 A1 | 5/2009 | Kim et al. |
| 2009/0131764 A1 | 5/2009 | Lee et al. |
| 2009/0133051 A1 | 5/2009 | Hildreth |
| 2009/0133071 A1 | 5/2009 | Sakai et al. |
| 2009/0138805 A1 | 5/2009 | Hildreth |
| 2009/0177538 A1* | 7/2009 | Brewer ................. G06Q 30/02 705/14.54 |
| 2009/0178089 A1* | 7/2009 | Picco ................... H04N 7/17336 725/87 |
| 2009/0191971 A1 | 7/2009 | Avent |

(56) References Cited

U.S. PATENT DOCUMENTS

| | | |
|---|---|---|
| 2009/0195652 A1 | 8/2009 | Gal |
| 2009/0199697 A1 | 8/2009 | Lehtiniemi et al. |
| 2009/0210790 A1 | 8/2009 | Thomas |
| 2009/0226046 A1 | 9/2009 | Shteyn |
| 2009/0228572 A1 | 9/2009 | Wall et al. |
| 2009/0254827 A1 | 10/2009 | Gonze et al. |
| 2009/0258708 A1 | 10/2009 | Figueroa |
| 2009/0265737 A1* | 10/2009 | Issa ................... G11B 27/105 725/38 |
| 2009/0265746 A1 | 10/2009 | Halen et al. |
| 2009/0297118 A1 | 12/2009 | Fink et al. |
| 2009/0320075 A1 | 12/2009 | Marko |
| 2010/0017820 A1 | 1/2010 | Thevathasan et al. |
| 2010/0042496 A1 | 2/2010 | Wang et al. |
| 2010/0050083 A1 | 2/2010 | Axen et al. |
| 2010/0069159 A1 | 3/2010 | Yamada et al. |
| 2010/0070987 A1 | 3/2010 | Amento et al. |
| 2010/0077290 A1 | 3/2010 | Pueyo |
| 2010/0088726 A1 | 4/2010 | Curtis et al. |
| 2010/0122286 A1* | 5/2010 | Begeja ............... H04N 21/2543 725/34 |
| 2010/0146145 A1 | 6/2010 | Tippin et al. |
| 2010/0153512 A1 | 6/2010 | Balassanian et al. |
| 2010/0153885 A1 | 6/2010 | Yates |
| 2010/0161792 A1 | 6/2010 | Palm et al. |
| 2010/0162344 A1* | 6/2010 | Casagrande ............ H04N 5/91 725/137 |
| 2010/0167816 A1 | 7/2010 | Perlman et al. |
| 2010/0167819 A1 | 7/2010 | Schell |
| 2010/0186032 A1 | 7/2010 | Pradeep et al. |
| 2010/0186579 A1 | 7/2010 | Schnitman |
| 2010/0199299 A1* | 8/2010 | Chang ............... H04N 21/4821 725/32 |
| 2010/0210351 A1 | 8/2010 | Berman |
| 2010/0251295 A1 | 9/2010 | Amento et al. |
| 2010/0262336 A1 | 10/2010 | Rivas et al. |
| 2010/0267450 A1 | 10/2010 | McMain |
| 2010/0268361 A1 | 10/2010 | Mantel et al. |
| 2010/0278509 A1 | 11/2010 | Nagano et al. |
| 2010/0287033 A1 | 11/2010 | Mathur |
| 2010/0287475 A1 | 11/2010 | van Zwol et al. |
| 2010/0293073 A1 | 11/2010 | Schmidt |
| 2010/0293455 A1 | 11/2010 | Bloch |
| 2010/0312670 A1 | 12/2010 | Dempsey |
| 2010/0325135 A1 | 12/2010 | Chen et al. |
| 2010/0332404 A1 | 12/2010 | Valin |
| 2011/0000797 A1 | 1/2011 | Henry |
| 2011/0007797 A1 | 1/2011 | Palmer et al. |
| 2011/0010742 A1 | 1/2011 | White |
| 2011/0026898 A1 | 2/2011 | Lussier et al. |
| 2011/0033167 A1 | 2/2011 | Arling et al. |
| 2011/0041059 A1 | 2/2011 | Amarasingham et al. |
| 2011/0060993 A1 | 3/2011 | Cotter et al. |
| 2011/0069940 A1 | 3/2011 | Shimy et al. |
| 2011/0078023 A1* | 3/2011 | Aldrey ................. G06Q 30/02 705/14.55 |
| 2011/0078740 A1 | 3/2011 | Bolyukh et al. |
| 2011/0096225 A1 | 4/2011 | Candelore |
| 2011/0125512 A1 | 5/2011 | Huang |
| 2011/0126106 A1 | 5/2011 | Ben Shaul et al. |
| 2011/0131493 A1 | 6/2011 | Dahl |
| 2011/0138331 A1 | 6/2011 | Pugsley et al. |
| 2011/0163969 A1 | 7/2011 | Anzures et al. |
| 2011/0169603 A1 | 7/2011 | Fithian et al. |
| 2011/0182366 A1 | 7/2011 | Frojdh et al. |
| 2011/0191684 A1 | 8/2011 | Greenberg |
| 2011/0191801 A1 | 8/2011 | Vytheeswaran |
| 2011/0193982 A1 | 8/2011 | Kook et al. |
| 2011/0197131 A1 | 8/2011 | Duffin et al. |
| 2011/0200116 A1 | 8/2011 | Bloch et al. |
| 2011/0202562 A1 | 8/2011 | Bloch et al. |
| 2011/0238494 A1 | 9/2011 | Park |
| 2011/0239246 A1* | 9/2011 | Woodward ............ H04N 7/173 725/35 |
| 2011/0246661 A1* | 10/2011 | Manzari ............. H04N 21/2662 709/231 |
| 2011/0246885 A1 | 10/2011 | Pantos et al. |
| 2011/0252031 A1 | 10/2011 | Blumenthal et al. |
| 2011/0252320 A1 | 10/2011 | Arrasvuori et al. |
| 2011/0264755 A1 | 10/2011 | Salvatore De Villiers |
| 2011/0282745 A1 | 11/2011 | Meoded et al. |
| 2011/0282906 A1* | 11/2011 | Wong ................ G06F 17/30831 707/780 |
| 2011/0293240 A1 | 12/2011 | Newton et al. |
| 2011/0307786 A1 | 12/2011 | Shuster |
| 2011/0307919 A1* | 12/2011 | Weerasinghe ........... H04N 5/76 725/32 |
| 2011/0307920 A1* | 12/2011 | Blanchard .......... H04N 21/4431 725/32 |
| 2011/0313859 A1* | 12/2011 | Stillwell ................ G06Q 30/02 705/14.58 |
| 2011/0314030 A1 | 12/2011 | Burba et al. |
| 2012/0004960 A1 | 1/2012 | Ma et al. |
| 2012/0005287 A1 | 1/2012 | Gadel et al. |
| 2012/0011438 A1 | 1/2012 | Kim et al. |
| 2012/0017141 A1 | 1/2012 | Eelen et al. |
| 2012/0062576 A1 | 3/2012 | Rosenthal et al. |
| 2012/0072420 A1 | 3/2012 | Moganti et al. |
| 2012/0081389 A1 | 4/2012 | Dilts |
| 2012/0089911 A1 | 4/2012 | Hosking et al. |
| 2012/0090000 A1 | 4/2012 | Cohen et al. |
| 2012/0094768 A1 | 4/2012 | McCaddon et al. |
| 2012/0105723 A1 | 5/2012 | van Coppenolle et al. |
| 2012/0110618 A1 | 5/2012 | Kilar et al. |
| 2012/0110620 A1 | 5/2012 | Kilar et al. |
| 2012/0117145 A1 | 5/2012 | Clift et al. |
| 2012/0120114 A1 | 5/2012 | You et al. |
| 2012/0134646 A1 | 5/2012 | Alexander |
| 2012/0137015 A1* | 5/2012 | Sun ................... H04N 21/6125 709/231 |
| 2012/0147954 A1 | 6/2012 | Kasai et al. |
| 2012/0159530 A1 | 6/2012 | Ahrens et al. |
| 2012/0159541 A1* | 6/2012 | Carton ............... H04N 21/2343 725/34 |
| 2012/0179970 A1 | 7/2012 | Hayes |
| 2012/0198412 A1 | 8/2012 | Creighton et al. |
| 2012/0198489 A1 | 8/2012 | O'Connell et al. |
| 2012/0213495 A1 | 8/2012 | Hafeneger et al. |
| 2012/0225693 A1 | 9/2012 | Sirpal et al. |
| 2012/0233631 A1 | 9/2012 | Geshwind |
| 2012/0246032 A1 | 9/2012 | Beroukhim et al. |
| 2012/0263263 A1 | 10/2012 | Olsen et al. |
| 2012/0308206 A1 | 12/2012 | Kulas |
| 2012/0317198 A1 | 12/2012 | Patton et al. |
| 2012/0324491 A1 | 12/2012 | Bathiche et al. |
| 2013/0021269 A1 | 1/2013 | Johnson et al. |
| 2013/0024888 A1* | 1/2013 | Sivertsen ......... H04N 21/44016 725/32 |
| 2013/0028446 A1 | 1/2013 | Krzyzanowski |
| 2013/0028573 A1 | 1/2013 | Hoofien et al. |
| 2013/0031582 A1* | 1/2013 | Tinsman ............ H04N 21/2353 725/36 |
| 2013/0033542 A1 | 2/2013 | Nakazawa |
| 2013/0036200 A1 | 2/2013 | Roberts et al. |
| 2013/0039632 A1 | 2/2013 | Feinson |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0061263 A1 | 3/2013 | Issa et al. |
| 2013/0094830 A1 | 4/2013 | Stone et al. |
| 2013/0097410 A1 | 4/2013 | Bourges-Sevenier |
| 2013/0097643 A1 | 4/2013 | Stone et al. |
| 2013/0117248 A1 | 5/2013 | Bhogal et al. |
| 2013/0125181 A1 | 5/2013 | Montemayor et al. |
| 2013/0129304 A1 | 5/2013 | Feinson |
| 2013/0129308 A1 | 5/2013 | Karn et al. |
| 2013/0167168 A1 | 6/2013 | Ellis et al. |
| 2013/0173765 A1 | 7/2013 | Korbecki |
| 2013/0177294 A1 | 7/2013 | Kennberg |
| 2013/0188923 A1 | 7/2013 | Hartley et al. |
| 2013/0195427 A1 | 8/2013 | Sathish |
| 2013/0202265 A1 | 8/2013 | Arrasvuori et al. |

(56) References Cited

U.S. PATENT DOCUMENTS

| | | |
|---|---|---|
| 2013/0204710 A1 | 8/2013 | Boland et al. |
| 2013/0205314 A1 | 8/2013 | Ramaswamy et al. |
| 2013/0219425 A1* | 8/2013 | Swartz ................. H04N 21/458 |
| | | 725/32 |
| 2013/0235152 A1 | 9/2013 | Hannuksela et al. |
| 2013/0235270 A1 | 9/2013 | Sasaki et al. |
| 2013/0254292 A1 | 9/2013 | Bradley |
| 2013/0259442 A1 | 10/2013 | Bloch et al. |
| 2013/0268620 A1 | 10/2013 | Osminer |
| 2013/0271453 A1 | 10/2013 | Ruotsalainen et al. |
| 2013/0282917 A1 | 10/2013 | Reznik et al. |
| 2013/0283401 A1 | 10/2013 | Pabla et al. |
| 2013/0290818 A1 | 10/2013 | Arrasvuori et al. |
| 2013/0298146 A1 | 11/2013 | Conrad et al. |
| 2013/0308926 A1 | 11/2013 | Jang et al. |
| 2013/0328888 A1 | 12/2013 | Beaver et al. |
| 2013/0330055 A1 | 12/2013 | Zimmermann et al. |
| 2013/0335427 A1* | 12/2013 | Cheung .................. G06T 13/00 |
| | | 345/473 |
| 2014/0015940 A1 | 1/2014 | Yoshida |
| 2014/0019865 A1 | 1/2014 | Shah |
| 2014/0025620 A1 | 1/2014 | Greenzeiger et al. |
| 2014/0025839 A1 | 1/2014 | Marko et al. |
| 2014/0040273 A1 | 2/2014 | Cooper et al. |
| 2014/0040280 A1 | 2/2014 | Slaney et al. |
| 2014/0046946 A2 | 2/2014 | Friedmann et al. |
| 2014/0068648 A1* | 3/2014 | Green ................. H04N 21/2358 |
| | | 725/18 |
| 2014/0078397 A1 | 3/2014 | Bloch et al. |
| 2014/0082666 A1 | 3/2014 | Bloch et al. |
| 2014/0085196 A1* | 3/2014 | Zucker ................. G06Q 30/0241 |
| | | 345/156 |
| 2014/0086445 A1 | 3/2014 | Brubeck et al. |
| 2014/0094313 A1 | 4/2014 | Watson et al. |
| 2014/0101550 A1 | 4/2014 | Zises |
| 2014/0105420 A1* | 4/2014 | Lee ...................... H03G 3/3026 |
| | | 381/107 |
| 2014/0109165 A1* | 4/2014 | Friedman ......... H04N 21/23424 |
| | | 725/131 |
| 2014/0126877 A1 | 5/2014 | Crawford et al. |
| 2014/0129618 A1 | 5/2014 | Panje et al. |
| 2014/0136186 A1 | 5/2014 | Adami et al. |
| 2014/0143298 A1 | 5/2014 | Klotzer et al. |
| 2014/0152564 A1 | 6/2014 | Gulezian et al. |
| 2014/0156677 A1 | 6/2014 | Collins, III et al. |
| 2014/0173650 A1* | 6/2014 | Mathews ........... H04N 21/6543 |
| | | 725/32 |
| 2014/0178051 A1 | 6/2014 | Bloch et al. |
| 2014/0186008 A1 | 7/2014 | Eyer |
| 2014/0194211 A1 | 7/2014 | Chimes et al. |
| 2014/0210860 A1 | 7/2014 | Caissy |
| 2014/0219630 A1 | 8/2014 | Minder |
| 2014/0220535 A1 | 8/2014 | Angelone |
| 2014/0237520 A1 | 8/2014 | Rothschild et al. |
| 2014/0245152 A1 | 8/2014 | Carter et al. |
| 2014/0270680 A1 | 9/2014 | Bloch et al. |
| 2014/0279032 A1 | 9/2014 | Roever et al. |
| 2014/0282013 A1 | 9/2014 | Amijee |
| 2014/0282642 A1 | 9/2014 | Needham et al. |
| 2014/0298173 A1 | 10/2014 | Rock |
| 2014/0314239 A1 | 10/2014 | Meyer et al. |
| 2014/0317638 A1 | 10/2014 | Hayes |
| 2014/0380167 A1 | 12/2014 | Bloch et al. |
| 2015/0007234 A1 | 1/2015 | Rasanen et al. |
| 2015/0012369 A1* | 1/2015 | Dharmaji ............ G06Q 30/0277 |
| | | 705/14.73 |
| 2015/0015789 A1 | 1/2015 | Guntur et al. |
| 2015/0020086 A1 | 1/2015 | Chen et al. |
| 2015/0033266 A1 | 1/2015 | Klappert et al. |
| 2015/0046946 A1 | 2/2015 | Hassell et al. |
| 2015/0058342 A1 | 2/2015 | Kim et al. |
| 2015/0063781 A1 | 3/2015 | Silverman et al. |
| 2015/0067596 A1 | 3/2015 | Brown et al. |
| 2015/0067723 A1 | 3/2015 | Bloch et al. |
| 2015/0070458 A1 | 3/2015 | Kim et al. |
| 2015/0070516 A1 | 3/2015 | Shoemake et al. |
| 2015/0074721 A1 | 3/2015 | Fishman et al. |
| 2015/0104144 A1 | 4/2015 | Minemura |
| 2015/0104155 A1 | 4/2015 | Bloch et al. |
| 2015/0106845 A1* | 4/2015 | Popkiewicz ....... G06Q 30/0601 |
| | | 725/34 |
| 2015/0124171 A1 | 5/2015 | King |
| 2015/0154439 A1 | 6/2015 | Anzue et al. |
| 2015/0160853 A1* | 6/2015 | Hwang ............... G06F 3/04883 |
| | | 715/720 |
| 2015/0179224 A1 | 6/2015 | Bloch et al. |
| 2015/0181271 A1 | 6/2015 | Onno et al. |
| 2015/0181291 A1 | 6/2015 | Wheatley |
| 2015/0181301 A1 | 6/2015 | Bloch et al. |
| 2015/0185965 A1 | 7/2015 | Belliveau et al. |
| 2015/0195601 A1 | 7/2015 | Hahm |
| 2015/0199116 A1 | 7/2015 | Bloch et al. |
| 2015/0201187 A1 | 7/2015 | Ryo |
| 2015/0228307 A1 | 8/2015 | Cabanero |
| 2015/0256861 A1 | 9/2015 | Oyman |
| 2015/0258454 A1 | 9/2015 | King et al. |
| 2015/0278986 A1 | 10/2015 | Edwin et al. |
| 2015/0286716 A1 | 10/2015 | Snibbe et al. |
| 2015/0293675 A1 | 10/2015 | Bloch et al. |
| 2015/0294685 A1 | 10/2015 | Bloch et al. |
| 2015/0304698 A1* | 10/2015 | Redol .................. H04N 21/854 |
| | | 725/23 |
| 2015/0310660 A1 | 10/2015 | Mogilefsky et al. |
| 2015/0318018 A1 | 11/2015 | Kaiser et al. |
| 2015/0331485 A1 | 11/2015 | Wilairat et al. |
| 2015/0331933 A1 | 11/2015 | Tocchini, IV et al. |
| 2015/0331942 A1 | 11/2015 | Tan |
| 2015/0348325 A1 | 12/2015 | Voss |
| 2015/0373385 A1* | 12/2015 | Straub ............. H04N 21/23424 |
| | | 725/34 |
| 2016/0009487 A1 | 1/2016 | Edwards et al. |
| 2016/0021412 A1 | 1/2016 | Zito, Jr. |
| 2016/0029002 A1 | 1/2016 | Balko |
| 2016/0037217 A1 | 2/2016 | Harmon et al. |
| 2016/0057497 A1 | 2/2016 | Kim et al. |
| 2016/0062540 A1 | 3/2016 | Yang et al. |
| 2016/0065831 A1 | 3/2016 | Howard et al. |
| 2016/0066051 A1* | 3/2016 | Caidar ............. H04N 21/47815 |
| | | 725/60 |
| 2016/0086585 A1 | 3/2016 | Sugimoto |
| 2016/0094875 A1 | 3/2016 | Peterson et al. |
| 2016/0099024 A1 | 4/2016 | Gilley |
| 2016/0100226 A1 | 4/2016 | Sadler et al. |
| 2016/0104513 A1 | 4/2016 | Bloch et al. |
| 2016/0105724 A1 | 4/2016 | Bloch et al. |
| 2016/0132203 A1 | 5/2016 | Seto et al. |
| 2016/0134946 A1 | 5/2016 | Glover et al. |
| 2016/0142889 A1 | 5/2016 | O'Connor et al. |
| 2016/0150278 A1 | 5/2016 | Greene |
| 2016/0162179 A1 | 6/2016 | Annett et al. |
| 2016/0170948 A1 | 6/2016 | Bloch |
| 2016/0173944 A1 | 6/2016 | Kilar et al. |
| 2016/0192009 A1 | 6/2016 | Sugio et al. |
| 2016/0217829 A1 | 7/2016 | Bloch et al. |
| 2016/0224573 A1 | 8/2016 | Shahraray et al. |
| 2016/0232579 A1* | 8/2016 | Fahnestock ......... G06Q 30/0272 |
| 2016/0277779 A1 | 9/2016 | Zhang et al. |
| 2016/0303608 A1 | 10/2016 | Jossick |
| 2016/0321689 A1 | 11/2016 | Turgeman |
| 2016/0322054 A1 | 11/2016 | Bloch et al. |
| 2016/0323608 A1 | 11/2016 | Bloch et al. |
| 2016/0337691 A1* | 11/2016 | Prasad ............... H04N 21/4394 |
| 2016/0344873 A1 | 11/2016 | Jenzeh et al. |
| 2016/0365117 A1 | 12/2016 | Boliek et al. |
| 2016/0366454 A1 | 12/2016 | Tatourian et al. |
| 2017/0006322 A1 | 1/2017 | Dury et al. |
| 2017/0032562 A1 | 2/2017 | Block et al. |
| 2017/0041372 A1* | 2/2017 | Hosur ................... H04L 65/762 |
| 2017/0062012 A1 | 3/2017 | Bloch et al. |
| 2017/0142486 A1 | 5/2017 | Masuda |
| 2017/0149795 A1 | 5/2017 | Day, II |
| 2017/0178409 A1 | 6/2017 | Bloch et al. |
| 2017/0178601 A1 | 6/2017 | Bloch et al. |

(56) References Cited

U.S. PATENT DOCUMENTS

| | | | |
|---|---|---|---|
| 2017/0195736 A1* | 7/2017 | Chai | H04N 21/4821 |
| 2017/0264920 A1 | 9/2017 | Mickelsen | |
| 2017/0280181 A1* | 9/2017 | Ramaley | H04N 21/6373 |
| 2017/0286424 A1 | 10/2017 | Peterson | |
| 2017/0289220 A1 | 10/2017 | Bloch et al. | |
| 2017/0295410 A1 | 10/2017 | Bloch et al. | |
| 2017/0326462 A1 | 11/2017 | Lyons et al. | |
| 2017/0337196 A1 | 11/2017 | Goela et al. | |
| 2017/0345460 A1 | 11/2017 | Bloch et al. | |
| 2018/0007443 A1 | 1/2018 | Cannistraro et al. | |
| 2018/0014049 A1 | 1/2018 | Griffin et al. | |
| 2018/0025078 A1 | 1/2018 | Quennesson | |
| 2018/0048831 A1 | 2/2018 | Berwick et al. | |
| 2018/0060430 A1 | 3/2018 | Lu | |
| 2018/0068019 A1 | 3/2018 | Novikoff et al. | |
| 2018/0095645 A1 | 4/2018 | Subudhi et al. | |
| 2018/0115592 A1 | 4/2018 | Samineni | |
| 2018/0130501 A1 | 5/2018 | Bloch et al. | |
| 2018/0176573 A1 | 6/2018 | Chawla et al. | |
| 2018/0191574 A1 | 7/2018 | Vishnia et al. | |
| 2018/0254067 A1 | 9/2018 | Elder | |
| 2018/0262798 A1 | 9/2018 | Ramachandra | |
| 2018/0300852 A1 | 10/2018 | Chen et al. | |
| 2018/0300858 A1 | 10/2018 | Chen et al. | |
| 2018/0310049 A1 | 10/2018 | Takahashi et al. | |
| 2018/0314959 A1 | 11/2018 | Apokatanidis et al. | |
| 2018/0376205 A1 | 12/2018 | Oswal et al. | |
| 2019/0005716 A1 | 1/2019 | Singh et al. | |
| 2019/0066188 A1 | 2/2019 | Rothschild | |
| 2019/0069038 A1 | 2/2019 | Phillips | |
| 2019/0069039 A1 | 2/2019 | Phillips | |
| 2019/0075367 A1 | 3/2019 | van Zessen et al. | |
| 2019/0090002 A1 | 3/2019 | Ramadorai et al. | |
| 2019/0098371 A1 | 3/2019 | Keesan | |
| 2019/0104342 A1 | 4/2019 | Catalano et al. | |
| 2019/0132639 A1 | 5/2019 | Panchaksharaiah et al. | |
| 2019/0139314 A1 | 5/2019 | Marsh et al. | |
| 2019/0166412 A1 | 5/2019 | Panchaksharaiah et al. | |
| 2019/0182525 A1* | 6/2019 | Steinberg | G11B 27/034 |
| 2019/0238719 A1 | 8/2019 | Alameh et al. | |
| 2019/0335225 A1* | 10/2019 | Fang | H04N 21/4183 |
| 2019/0354936 A1 | 11/2019 | Deluca et al. | |
| 2020/0023157 A1 | 1/2020 | Lewis et al. | |
| 2020/0029128 A1 | 1/2020 | Erskine | |
| 2020/0037047 A1 | 1/2020 | Cheung et al. | |
| 2020/0059699 A1 | 2/2020 | Malev et al. | |
| 2020/0169787 A1 | 5/2020 | Pearce et al. | |
| 2020/0193163 A1 | 6/2020 | Chang et al. | |
| 2020/0344508 A1 | 10/2020 | Edwards et al. | |
| 2021/0263564 A1 | 8/2021 | Chen et al. | |
| 2022/0046291 A1 | 2/2022 | Jiang et al. | |
| 2022/0245209 A1 | 8/2022 | Cho et al. | |

FOREIGN PATENT DOCUMENTS

| | | |
|---|---|---|
| DE | 10053720 A1 | 4/2002 |
| EP | 0965371 A2 | 12/1999 |
| EP | 1033157 A2 | 9/2000 |
| EP | 2104105 A1 | 9/2009 |
| GB | 2359916 A | 9/2001 |
| GB | 2428329 A | 1/2007 |
| JP | 2003-245471 A | 9/2003 |
| JP | 2008005288 A | 1/2008 |
| KR | 2004/0005068 A | 1/2004 |
| KR | 2010/0037413 A | 4/2010 |
| WO | WO-1996/013810 A1 | 5/1996 |
| WO | WO-2000/059224 A1 | 10/2000 |
| WO | WO-2007/062223 A2 | 5/2007 |
| WO | WO-2007/138546 A2 | 12/2007 |
| WO | WO-2008/001350 A2 | 1/2008 |
| WO | WO-2008/052009 A2 | 5/2008 |
| WO | WO-2008/057444 A2 | 5/2008 |
| WO | WO-2009/125404 A2 | 10/2009 |
| WO | WO-2009/137919 A1 | 11/2009 |

OTHER PUBLICATIONS

Archos Gen 5 English User Manual Version 3.0, Jul. 26, 2007, p. 1-81.
Bartlett, "iTunes 11: How to Queue Next Song," *Technipages*, Oct. 6, 2008, pp. 1-8, Retrieved from the Internet on Dec. 26, 2013, http://www.technipages.com/itunes-queue-next-song.html.
International Search Report and Written Opinion for International Patent Application PCT/IB2013/001000 dated Jul. 31, 2013 (11 pages).
International Search Report for International Application PCT/IL2010/000362 dated Aug. 25, 2010 (6 pages).
International Search Report for International Patent Application PCT/IL2012/000080 dated Aug. 9, 2012 (4 pages).
International Search Report for International Patent Application PCT/IL2012/000081 dated Jun. 28, 2012 (4 pages).
Labs.byHook: "Ogg Vorbis Encoder for Flash: Alchemy Series Part 1," Retrieved from Internet on on Dec. 17, 2012: URL:http://labs.byhook.com/2011/02/15/ogg-vorbis-encoder-for-flash-alchem- y-series-part-1/, 2011, 6 pages.
Miller, Gregor et al., "MiniDiver: A Novel Mobile Media Playback Interface for Rich Video Content on an iPhoneTM", Entertainment Computing A ICEC 2009, Sep. 3, 2009, pp. 98-109.
Sodagar, I., "The MPEG-DASH Standard for Multimedia Streaming Over the Internet", IEEE Multimedia, IEEE Service Center, New York, NY US, (2011) 18(4): 62-67.
Supplemental European Search Report for EP10774637.2 (PCT/IL2010/000362) dated Jun. 28, 2012 (6 pages).
Supplemental European Search Report for EP13184145 dated Jan. 30, 2014 (5 pages).
Yang, H, et al., "Time Stamp Synchronization in Video Systems," Teletronics Technology Corporation, <http://www.ttcdas.com/products/daus_encoders/pdf/_tech_papers/tp_2010_time_stamp_video_system.pdf>, Abstract, (8 pages).
U.S. Appl. No. 14/639,579 Published as US2015/0199116, Progress Bar for Branched Videos, filed Mar. 5, 2015.
U.S. Appl. No. 15/481,916 U.S. Pat. No. 9,653,155 Published as US2015/0294685, Systems and Methods for Creating Linear Video from Branched Video, filed Apr. 10, 2014.
U.S. Appl. No. 14/249,665 Published as US2015/0293675, Dynamic Timeline for Branched Video, filed Apr. 10, 2014.
U.S. Appl. No. 14/509,700 Published as US2016/0104513, Systems and Methods for Dynamic Video Bookmarking, filed Oct. 8, 2014.
U.S. Appl. No. 15/703,462, Systems and Methods for Dynamic Video Bookmarking, filed Oct. 13, 2017.
U.S. Appl. No. 14/700,845 Published as U52016/0323608, Systems and Methods for Nonlinear Video Playback Using Linear Real-Time Video Players, filed Apr. 30, 2015.
U.S. Appl. No. 15/085,209, Media Stream Rate Synchronization, filed Mar. 30, 2016.
U.S. Appl. No. 15/189,931, Dynamic Summary Generation for Real-time Switchable Videos, filed Jun. 22, 2016.
U.S. Appl. No. 15/395,477, Systems and Methods for Dynamic Weighting of Branched Video Paths, filed Dec. 30, 2016.
U.S. Appl. No. 15/997,284, Interactive Video Dynamic Adaptation and User Profiling, filed Jun. 4, 2018.
U.S. Appl. No. 16/283,066, Dynamic Library Display for Interactive Videos, filed Feb. 22, 2019.
U.S. Appl. No. 13/033,916, now U.S. Pat. No. 9,607,655, the Office Actions dated Jun. 7, 2013, Jan. 2, 2014, Aug. 28, 2014, Jan. 5, 2015, Jul. 9, 2015, and Jan. 6, 2016; the Advisory Action dated May 11, 2016; and the Notice of Allowance dated Dec. 21, 2016.
U.S. Appl. No. 14/884,285, the Office Actions dated Oct. 5, 2017 and Jul. 26, 2018.
U.S. Appl. No. 14/069,694, now U.S. Pat. No. 9,271,015, the Office Actions dated Apr. 27, 2015 and Aug. 31, 2014, the Notice of Allowance dated Oct. 13, 2015.
U.S. Appl. No. 14/639,579, the Office Actions dated May 3, 2017, Nov. 22, 2017 and Jun. 26, 2018, the Notice of Allowance dated Feb. 8, 2019.
U.S. Appl. No. 13/838,830, now U.S. Pat. No. 9,257,148, the Office Action dated May 7, 2015, the Notice of Allowance dated Nov. 6, 2015.

(56) References Cited

OTHER PUBLICATIONS

U.S. Appl. No. 14/107,600, the Office Actions dated Dec. 19, 2014, Jul. 8, 2015, Jun. 3, 2016, Mar. 8, 2017, Oct. 10, 2017 and Jul. 25, 2018, Notice of Allowance dated Dec. 31, 2018 and Notice of Allowance dated Apr. 25, 2019.
U.S. Appl. No. 14/249,665, now U.S. Pat. No. 9,792,026, the Office Actions dated May 16, 2016 and Feb. 22, 2017; and the Notice of Allowance dated Jun. 2, 2017.
U.S. Appl. No. 14/534,626, the Office Actions dated Nov. 25, 2015, Jul. 5, 2016, Jun. 5, 2017, Mar. 2, 2018 and Sep. 26, 2018.
U.S. Appl. No. 14/835,857, the Office Actions dated Sep. 23, 2016, Jun. 5, 2017 and Aug. 9, 2018, and the Advisory Action dated Oct. 20, 2017; and the Notice of Allowance dated Feb. 26, 2019.
U.S. Appl. No. 14/978,464, the Office Actions dated Sep. 8, 2017, May 18, 2018 and Dec. 14, 2018.
U.S. Appl. No. 14/978,491, the Office Actions dated Sep. 8, 2017, May 25, 2018 and Dec. 14, 2018.
U.S. Appl. No. 15/085,209, the Office Actions dated Feb. 26, 2018 and Dec. 31, 2018.
U.S. Appl. No. 15/189,931, the Office Actions dated Apr. 6, 2018, Notice of Allowance dated Oct. 24, 2018.
U.S. Appl. No. 15/395,477, the Office Actions dated Nov. 2, 2018.
U.S. Appl. No. 15/863,191, Notice of Allowance dated Jul. 5, 2018 and Nov. 23, 2018.
U.S. Appl. No. 16/986,977, Systems and Methods for Creating Linear Video From Branched Video, filed Aug. 6, 2020.
U.S. Appl. No. 14/534,626 Published as US-2018-0130501-A1, Systems and Methods for Dynamic Video Bookmarking, filed Sep. 13, 2017.
U.S. Appl. No. 16/865,896, Systems and Methods for Dynamic Video Bookmarking, filed May 4, 2020.
U.S. Appl. No. 16/752,193, Systems and Methods for Nonlinear Video Playback Using Linear Real-Time Video Players, filed Jan. 24, 2020.
U.S. Appl. No. 16/800,994, Systems and Methods for Adaptive and Responsive Video, filed Feb. 25, 2020.
U.S. Appl. No. 14/978,491 Published as US2017/0178409, Seamless Transitions in Large-Scale Video, filed Dec. 22, 2015.
U.S. Appl. No. 15/395,477 Published as US2018/0191574, Systems and Methods for Dynamic Weighting of Branched Video Paths, filed Dec. 30, 2016.
U.S. Appl. No. 16/283,066 Published as US2019/0349637, Dynamic Library Display for Interactive Videos, filed Feb. 22, 2019.
U.S. Appl. No. 17/091,149, Dynamic Library Display for Interactive Videos, filed Nov. 6, 2020.
U.S. Appl. No. 16/591,103, Systems and Methods for Dynamically Adjusting Video Aspect Ratios, filed Oct. 2, 2019.
U.S. Appl. No. 16/793,205, Dynamic Adaptation of Interactive Video Players Using Behavioral Analytics, filed Feb. 18, 2020.
U.S. Appl. No. 16/793,201, Systems and Methods for Detecting Anomalous Activities for Interactive Videos, filed Feb. 18, 2020.
U.S. Appl. No. 16/922,540, Systems and Methods for Seamless Audio and Video Endpoint Transitions, filed Jul. 7, 2020.
U.S. Appl. No. 12/706,721, now U.S. Pat. No. 9,190,110, the Office Actions dated Apr. 26, 2012, Aug. 17, 2012, Mar. 28, 2013, Jun. 20, 2013, Jan. 3, 2014, Jul. 7, 2014, and Dec. 19, 2014; the Notices of Allowances dated Jun. 19, 2015, Jul. 17, 2015, Jul. 29, 2015, Aug. 12, 2015, and Sep. 14, 2015.
U.S. Appl. No. 14/884,284, the Office Actions dated Sep. 8, 2017; May 18, 2018; Dec. 14, 2018; Jul. 25, 2019; Nov. 18, 2019 and Feb. 21, 2020.
U.S. Appl. No. 13/034,645, the Office Actions dated Jul. 23, 2012, Mar. 21, 2013, Sep. 15, 2014, Jun. 4, 2015, Apr. 7, 2017, Oct. 6, 2017, Aug. 10, 2018, Jul. 5, 2016, Apr. 5, 2019 and Dec. 26, 2019.
U.S. Appl. No. 14/639,579, now U.S. Pat. No. 10,474,334, the Office Actions dated May 3, 2017, Nov. 22, 2017 and Jun. 26, 2018, the Notices of Allowances dated Feb. 8, 2019 and Jul. 11, 2019.
U.S. Appl. No. 13/838,830, now U.S. Pat. No. 9,257,148, the Office Action dated May 7, 2015, Notices of Allowance dated Nov. 6, 2015.

U.S. Appl. No. 14/984,821, now U.S. Pat. No. 10,418,066, the Office Actions dated Jun. 1, 2017, Dec. 6, 2017, and Oct. 5, 2018; the Notice of Allowance dated May 7, 2019.
U.S. Appl. No. 14/107,600, now U.S. Pat. No. 10,448,119, the Office Actions dated Dec. 19, 2014, Jul. 8, 2015, Jun. 3, 2016, Mar. 8, 2017, Oct. 10, 2017 and Jul. 25, 2018, and the Notices of Allowance dated Dec. 31, 2018 and Apr. 25, 2019.
U.S. Appl. No. 15/481,916, the Office Actions dated Oct. 6, 2017, Aug. 6, 2018, Mar. 8, 2019, Nov. 27, 2019, and the Notice of Allowance dated Apr. 21, 2020.
U.S. Appl. No. 14/249,665, now U.S. Pat. No. 9,792,026, the Office Actions dated May 16, 2016 and Feb. 22, 2017; and the Notices of Allowance dated Jun. 2, 2017 and Jul. 24, 2017.
U.S. Appl. No. 15/703,462, the Office Action dated Jun. 21, 2019, and Dec. 27, 2019; and the Notice of Allowance dated Feb. 10, 2020.
U.S. Appl. No. 16/865,896, the Notice of Allowance dated Sep. 3, 2020.
U.S. Appl. No. 14/534,626, the Office Actions dated Nov. 25, 2015, Jul. 5, 2016, Jun. 5, 2017, Mar. 2, 2018, Sep. 26, 2018, May 8, 2019, Dec. 27, 2019; and Aug. 19, 2020.
U.S. Appl. No. 14/700,845, now U.S. Pat. No. 9,653,115, the Office Actions dated May 20, 2016, Dec. 2, 2016, May 22, 2017, Nov. 28, 2017, Jun. 27, 2018 and Feb. 19, 2019 and the Notice of Allowance dated Oct. 21, 2019.
U.S. Appl. No. 14/835,857, now U.S. Pat. No. 10,460,765, the Office Actions dated Sep. 23, 2016, Jun. 5, 2017 and Aug. 9, 2018, and the Advisory Action dated Oct. 20, 2017; Notice of Allowance dated Feb. 25, 2019 and Jun. 7, 2019.
U.S. Appl. No. 16/559,082, the Office Actions dated Feb. 20, 2020 and Jul. 23, 2020.
U.S. Appl. No. 16/800,994, the Office Action dated Apr. 15, 2020.
U.S. Appl. No. 14/978,464, the Office Actions dated Jul. 25, 2019, Dec. 14, 2018, May 18, 2018, Sep. 8, 2017, Dec. 14, 2018, Jul. 25, 2019, Nov. 18, 2019, Jul. 23, 2020.
U.S. Appl. No. 14/978,491, the Office Actions dated Sep. 8, 2017, May 25, 2018, Dec. 14, 2018, Aug. 12, 2019; Dec. 23, 2019; and Jul. 23, 2020.
U.S. Appl. No. 15/085,209, now U.S. Pat. No. 10,462,202, the Office Actions dated Feb. 26, 2018 and Dec. 31, 2018; the Notice of Allowance dated Aug. 12, 2019.
U.S. Appl. No. 15/189,931, now U.S. Pat. No. 10,218,760, the Office Actions dated Apr. 6, 2018, Notice of Allowance dated Oct. 24, 2018.
U.S. Appl. No. 15/395,477, the Office Actions dated Nov. 2, 2018, Aug. 16, 2019, and Apr. 16, 2020.
U.S. Appl. No. 15/997,284, the Office Actions dated Aug. 1, 2019, Nov. 21, 2019 and Apr. 28, 2020.
U.S. Appl. No. 15/863,191, now U.S. Pat. No. 10,257,578, the Notices of Allowance dated Jul. 5, 2018 and Nov. 23, 2018.
U.S. Appl. No. 16/283,066, now U.S. Pat. No. 10,856,049, the Office Action dated Jan. 6, 2020, Notice of Allowance dated Jul. 29, 2020.
U.S. Appl. No. 16/591,103, the Office Action dated Apr. 22, 2020.
U.S. Appl. No. 14/884,285 Published as US2017/0178601, Systems and Method for Assembling a Recorded Composition, filed Oct. 15, 2015.
U.S. Appl. No. 14/249,665 9,792,026 Published as US2015/0293675, Dynamic Timeline for Branched Video, filed Apr. 10, 2014.
U.S. Appl. No. 14/534,626 U.S. Pat. No. 10,692,540 Published as US-2018-0130501-A1, Systems and Methods for Dynamic Video Bookmarking, filed Sep. 13, 2017.
U.S. Appl. No. 16/865,896 U.S. Pat. No. 10,885,944 Published as US2020/0265870, Systems and Methods for Dynamic Video Bookmarking, filed May 4, 2020.
U.S. Appl. No. 17/138,434 Published as US2021/0366520, Systems and Methods for Dynamic Video Bookmarking, filed Dec. 30, 2020.
U.S. Appl. No. 17/701,168, Systems and Methods for Dynamic Video Bookmarking, filed Mar. 22, 2022.
U.S. Appl. No. 14/700,845 10,582,265 Published as US2016/0323608, Systems and Methods for Nonlinear Video Playback Using Linear Real-Time Video Players, filed Apr. 30, 2015.

(56) References Cited

OTHER PUBLICATIONS

U.S. Appl. No. 16/752,193 Published as US2020/0404382, Systems and Methods for Nonlinear Video Playback Using Linear Real-Time Video Players, filed Jan. 24, 2020.
U.S. Appl. No. 15/395,477 Published as US2021/0281626, Systems and Methods for Dynamic Weighting of Branched Video Paths, filed Dec. 30, 2016.
U.S. Appl. No. 17/091,149 Published as US2021/0306707, Dynamic Library Display for interactive Videos, filed Nov. 6, 2020.
U.S. Appl. No. 16/793,201 Published as US2021/0258640, Systems and Methods for Detecting Anomalous Activities for Interactive Videos, filed Feb. 18, 2020.
International Preliminary Report and Written Opinion of PCT/IL2012/000080 dated Aug. 27, 2013, 7 pages.
Marciel, M. et al., "Understanding the Detection of View Fraud in Video Content Portals", (Feb. 5, 2016), Cornell University, pp. 1-13.
U.S. Appl. No. 14/700,845 U.S. Pat. No. 10,582,265 Published as US2016/0323608, Systems and Methods for Nonlinear Video Playback Using Linear Real-Time Video Players, filed Apr. 30, 2015.
U.S. Appl. No. 14/884,285 U.S. Pat. No. 11,314,936 Published as US2017/0178601, Systems and Method for Assembling a Recorded Composition, filed Oct. 15, 2015.
U.S. Appl. No. 13/034,645 U.S. Pat. No. 11,232,458 Published as US2011/0202562, System and Method for Data Mining Within Interactive Multimedia, filed Feb. 24, 2011.
U.S. Appl. No. 17/551,847 Published as US2021/0366520, Systems and Methods for Data Mining Within Interactive Multimedia, filed Dec. 15, 2021.
U.S. Appl. No. 14/639,579 U.S. Pat. No. 10,474,334 Published as US2015/0199116, Progress Bar for Branched Videos, filed Mar. 5, 2015.
U.S. Appl. No. 14/984,821 U.S. Pat. No. 10,418,066 Published as US2016/0217829, System and Method for Synchronization of Selectably Presentable Media Streams, filed Dec. 30, 2015.
U.S. Appl. No. 14/107,600 U.S. Pat. No. 10,448,119 Published as US2015/0067723, Methods and Systems for Unfolding Video Pre-Roll, filed Dec. 16, 2013.
U.S. Appl. No. 14/249,627 U.S. Pat. No. 9,653,115 Published as US2015-0294685, Video Systems and Methods for Creating Linear Video From Branched, filed Apr. 10, 2014.
U.S. Appl. No. 15/481,916 U.S. Pat. No. 10,755,747 Published as US2017-0345460, Systems and Methods for Creating Linear Video From Branched Video, filed Apr. 7, 2017.
U.S. Appl. No. 16/986,977 Published as US2020/0365187 Systems and Methods for Creating Linear Video From Branched Video, filed Aug. 6, 2020.
14/534,626 10,692,540 Published as US-2018-0130501-A1 Systems and Methods for Dynamic Video Bookmarking Sep. 13, 2017.
16/865.896 10 885 944 Published as US2020/0265870 Systems and Methods for Dynamic Video Bookmarking May 04, 2020.
17/138,434 11 348 618 Published as US2021/0366520 Systems and Methods for Dynamic Video Bookmarking Dec. 30, 2020.
17/701,168 Published as US2022/0215861 Systems and Methods for Dynamic Video Bookmarking Mar. 22, 2022.
14/534,626 Published as US2016/0105724 Systems and Methods for Parallel Track Transitions 3/31/22.
14/700,845 10,582,265 Published as US2016/0323608 Systems and Methods for Nonlinear Video Playback Using Linear Real-Time Video Players Apr. 30, 2015.
16/752,193 Published as US2020/0404382 Systems and Methods for Nonlinear Video Playback Using Linear Real-Time Video Players Jan. 24, 2020.
14/700,862 9,672,868 Published as US2016/0322054 Systems and Methods for Seamless Media Creation Apr. 30, 2015.
U.S. Appl. No. 14/835,857 U.S. Pat. No. 10,460,765 Published as US2017/0062012, Systems and Methods for Adaptive and Responsive Video, filed Aug. 26, 2015.
U.S. Appl. No. 16/559,082 Published as US2019/0392868, Systems and Methods for Adaptive and Responsive Video, filed Sep. 3, 2019.

U.S. Appl. No. 14/978,464 U.S. Pat. No. 11,164,548 Published as US2017/0178601, Intelligent Buffering of Large-Scale Video, filed Dec. 22, 2015.
U.S. Appl. No. 14/978,491 U.S. Pat. No. 11,128,853 Published as US2017/0178409, Seamless Transitions in Large-Scale Video, filed Dec. 22, 2015.
U.S. Appl. No. 17/403,703 Published as US2022/0038673, Seamless Transitions in Large-Scale Video, filed Aug. 16, 2021.
U.S. Appl. No. 15/085,209 U.S. Pat. No. 10,462,202 Published as US2017/0289220, Media Stream Rate Synchronization, filed Mar. 30, 2016.
U.S. Appl. No. 15/189,931 U.S. Pat. No. 10,218,760 Published as US2017/0374120, Dynamic Summary Generation for Realtime Switchable Videos, filed Jun. 22, 2016.
U.S. Appl. No. 15/395,477 U.S. Pat. No. 11,050,809 Published as US2018/0191574, Systems and Methods for Dynamic Weighting of Branched Video Paths, filed Dec. 30, 2016.
U.S. Appl. No. 17/328,261 Published as US2021/0281626, Systems and Methods for Dynamic Weighting of Branched Video Paths, filed May 24, 2021.
U.S. Appl. No. 15/997,284 Published as US2019/0373330, Interactive Video Dynamic Adaptation and User Profiling, filed Jun. 4, 2018.
U.S. Appl. No. 15/863,191 U.S. Pat. No. 10,257,578, Dynamic Library' Display for Interactive Videos, filed Jan. 5, 2018.
U.S. Appl. No. 16/283,066 U.S. Pat. No. 10,856,049 Published as US2019/0349637, Dynamic Library Display for Interactive Videos, filed Feb. 22, 2019.
U.S. Appl. No. 17/091,149 U.S. Pat. No. 11,528,534, Dynamic Library Display for Interactive Videos, filed Nov. 6, 2020.
U.S. Appl. No. 16/591,103 Published as US2021/0105433, Systems and Methods for Dynamically Adjusting Video Aspect Ratios, filed Oct. 2, 2019.
U.S. Appl. No. 16/793,205 Published as US2021/0258647, Dynamic adaptation of interactive video players using behavioral analytics, filed Feb. 18, 2020.
U.S. Appl. No. 16/793,201 U.S. Pat. No. 11,245,961 Published as US2021/0258640, Systems and Methods for Detecting Anomalous Activities for Interactive Videos, filed Feb. 18, 2020.
U.S. Appl. No. 16/922,540 Published as US2022/0014817, Systems and Methods for Seamless Audio and Video Endpoint Transitions, filed Jul. 7, 2020.
U.S. Appl. No. 17/462,199, Shader-based dynamic video manipulation, filed Aug. 31, 2021.
U.S. Appl. No. 17/462,222, Shader-based dynamic video manipulation, filed Aug. 31, 2021.
U.S. Appl. No. 17/334,027, Automated platform for generating interactive videos, filed May 28, 2021.
U.S. Appl. No. 17/484,604, Discovery engine for interactive videos, filed Sep. 24, 2021.
U.S. Appl. No. 17/484,635, Video player integration within websites, filed Sep. 24, 2021.
Bodaghi, A. et al., "Personalization of Interactive Recommender Systems for Expert Users", 4th International Conference on the Web Research (ICWR), (2018), pp. 58-62.
U.S. Appl. No. 12/706,721 U.S. Pat. No. 9,190,110 Published as US2010/0293455, System and Method for Assembling a Recorded Composition, filed Feb. 17, 2010.
U.S. Appl. No. 13/033,916 U.S. Pat. No. 9,607,655 Published as US2011/0200116, System and Method for Seamless Multimedia Assembly, filed Feb. 24, 2011.
U.S. Appl. No. 13/034,645 Published as US2011/0202562, System and Method for Data Mining Within Interactive Multimedia, filed Feb. 24, 2011.
U.S. Appl. No. 14/884,285 Published as US2016/0170948, System and Method for Assembling a Recorded Composition, filed Oct. 15, 2015.
U.S. Appl. No. 13/437,164 U.S. Pat. No. 8,600,220 Published as US2013/0259442, Systems and Methods for Loading More Than One Video Content at a Time, filed Apr. 2, 2012.
U.S. Appl. No. 14/069,694 U.S. Pat. No. 9,271,015 Published as US2014/0178051, Systems and Methods for Loading More Than One Video Content at a Time, filed Nov. 1, 2013.

(56) References Cited

OTHER PUBLICATIONS

U.S. Appl. No. 13/622,780 U.S. Pat. No. 8,860,882 Published as US2014/0078397, Systems and Methods for Constructing Multimedia Content Modules, filed Sep. 19, 2012.
U.S. Appl. No. 13/622,795 U.S. Pat. No. 9,009,619 Published as US2014/0082666, Progress Bar for Branched Videos, filed Sep. 19, 2012.
U.S. Appl. No. 14/639,579 Published as US2015/0199116, Videos Progress Bar for Branched, filed Mar. 5, 2015.
U.S. Appl. No. 13/838,830 U.S. Pat. No. 9,257,148 Published as US2014/0270680, System and Method for Synchronization of Selectably Presentable Media Streams, filed Mar. 15, 2013.
U.S. Appl. No. 14/984,821 Published as US2016/0217829, System and Method for Synchronization of Selectably Presentable Media Streams, filed Dec. 30, 2015.
U.S. Appl. No. 13/921,536 U.S. Pat. No. 9,832,516 Published as US2014/0380167, Systems and Methods for Multiple Device Interaction with Selectably Presentable Media Streams, filed Jun. 19, 2013.
U.S. Appl. No. 14/107,600 Published as US2015/0067723, Methods and Systems for Unfolding Video Pre-Roll, filed Dec. 16, 2013.
U.S. Appl. No. 14/335,381 U.S. Pat. No. 9,530,454 Published as US2015/0104155, Systems and Methods for Real-Time Pixel Switching, filed Jul. 18, 2014.
U.S. Appl. No. 15/356,913, Systems and Methods for Real-Time Pixel Switching, filed Nov. 21, 2016.
U.S. Appl. No. 14/139,996 U.S. Pat. No. 9,641,898 Published as US2015/0181301, Methods and Systems for In-Video Library, filed Dec. 24, 2013.
U.S. Appl. No. 14/140,007 U.S. Pat. No. 9,520,155 Published as US2015/0179224, Methods and Systems for Seeking to Non-Key Frames, filed Dec. 24, 2013.
U.S. Appl. No. 14/249,627 U.S. Pat. No. 9,653,115 Published as US2015/0294685, Systems and Methods for Creating Linear Video From Branched Video, filed Apr. 10, 2014.
U.S. Appl. No. 15/481,916 Published as US2017/0345460, Systems and Methods for Creating Linear Video From Branched Video, filed Apr. 7, 2017.
U.S. Appl. No. 14/249,665 U.S. Pat. No. 9,792,026 Published as US2015/0293675, Dynamic Timeline for Branched Video, filed Apr. 10, 2014.
U.S. Appl. No. 14/509,700 U.S. Pat. No. 9,792,957 Published as US2016/0104513, Systems and Methods for Dynamic Video Bookmarking, filed Oct. 8, 2014.
U.S. Appl. No. 14/534,626 Published as US2016/0105724, Systems and Methods for Parallel Track Transitions, filed Nov. 6, 2014.
U.S. Appl. No. 14/700,845 Published as US2016/032360, Systems and Methods for Nonlinear Video Playback Using Linear Real-Time Video Players, filed Apr. 30, 2015.
U.S. Appl. No. 14/700,862 U.S. Pat. No. 9,672,868 Published as US2016/0322054, Systems and Methods for Seamless Media Creation, filed Apr. 30, 2015.
U.S. Appl. No. 14/835,857 Published as US2017/0062012, Systems and Methods for Adaptive and Responsive Video, filed Aug. 26, 2015.
U.S. Appl. No. 14/978,464 Published as US2017/0178601, Intelligent Buffering of Large-Scale Video, filed Dec. 22, 2015.
U.S. Appl. No. 14/978,491 Published as U52017/0178409, Seamless Transitions in Large-Scale Video, filed Dec. 22, 2015.
U.S. Appl. No. 15/085,209 Published as US-2017/0289220, Media Stream Rate Synchronization, filed Mar. 30, 2016.
U.S. Appl. No. 15/189,931 Published as US-2017-0374120, Dynamic Summary Generation for Real-Time Switchable Videos, filed Jun. 22, 2016.
U.S. Appl. No. 15/395,477 Published as US-2018-0191574, Systems and Methods for Dynamic Weighing of Branched Video Paths, filed Dec. 30, 2016.
U.S. Appl. No. 15/997,284, Interactive Video Dynamic Adaption and User Profiling, filed Jun. 4, 2018.
U.S. Appl. No. 15/863,191, Dynamic Library Display for Interactive Videos, filed Jan. 5, 2018.
U.S. Appl. No. 12/706,721, now U.S. Pat. No. 9,190,110, the Office Actions dated Apr. 26, 2012, Aug. 17, 2012, Mar. 28, 2013, Jun. 20, 2013, Jan. 3, 2014, Jul. 7, 2014, and Dec. 19, 2014; the Notices of Allowance dated Jun. 19, 2015 and Jul. 17, 2015; the Notices of Allowance dated Jul. 29, 2015, Aug. 12, 2015 and Sep. 14, 2015.
U.S. Appl. No. 13/033,916, now U.S. Pat. No. 9,607,655, the Office Actions dated Jun. 7, 2013, Jan. 2, 2014, Aug. 28, 2014, Jan. 5, 2015, Jul. 9, 2015, and Jan. 5, 2016; the Advisory Action dated May 11, 2016; and the Notice of Allowance dated Dec. 21, 2016.
U.S. Appl. No. 13/034,645, the Office Actions dated Jul. 23, 2012, Mar. 21, 2013, Sep. 15, 2014, Jun. 4, 2015, Apr. 7, 2017, Oct. 6, 2017 and Aug. 10, 2018.
U.S. Appl. No. 13/437,164, now U.S. Pat. No. 8,600,220, the Notice of Allowance dated Aug. 9, 2013.
U.S. Appl. No. 14/069,694, now U.S. Pat. No. 9,271,015, the Office Actions dated Apr. 27, 2015 and Aug. 31, 2015, the Notice of Allowance dated Oct. 13, 2015.
U.S. Appl. No. 13/622,780, now U.S. Pat. No. 8,860,882, the Office Action dated Jan. 16, 2014, the Notice of Allowance dated Aug. 4, 2014.
U.S. Appl. No. 13/622,795, now U.S. Pat. No. 9,009,619, the Office Actions dated May 23, 2014 and Dec. 1, 2014, the Notice of Allowance dated Jan. 9, 2015.
U.S. Appl. No. 14/639,579, the Office Actions dated May 3, 2017, Nov. 22, 2017 and Jun. 26, 2018.
U.S. Appl. No. 13/383,830, now U.S. Pat. No. 9,257,148, the Office Action dated May 7, 2015, the Notice of Allowance dated Nov. 6, 2015.
U.S. Appl. No. 14/984,821, the Office Actions dated Jun. 1, 2017, Dec. 6, 2017, and Oct. 5, 2018.
U.S. Appl. No. 13/921,536, now U.S. Pat. No. 9,832,516, the Office Actions dated Feb. 25, 2015, Oct. 20, 2015, Aug. 26, 2016 and Mar. 8, 2017, the Advisory Action dated Jun. 21, 2017, and Notice of Allowance dated Sep. 12, 2017.
U.S. Appl. No. 14/107,600, the Office Actions dated Dec. 19, 2014, Jul. 8, 2015, Jun. 3, 2016, Mar. 8, 2017, Oct. 10, 2017 and Jul. 25, 2018.
U.S. Appl. No. 14/335,381, now U.S. Pat. No. 9,530,454, the Office Action dated Feb. 12, 2016; and the Notice of Allowance dated Aug. 24, 2016.
U.S. Appl. No. 14/139,996, now U.S. Pat. No. 9,641,898, the Office Actions dated Jun. 18, 2015, Feb. 3, 2016 and May 4, 2016; and the Notice of Allowance dated Dec. 23, 2016.
U.S. Appl. No. 14/140,007, now U.S. Pat. No. 9,520,155, the Office Actions dated Sep. 8, 2015 and Apr. 26, 2016; and the Notice of Allowance dated Oct. 11, 2016.
U.S. Appl. No. 14/249,627, now U.S. Pat. No. 9,653,115, the Office Actions dated Jan. 14, 2016 and Aug. 9, 2016; and the Notice of Allowance dated Jan. 13, 2017.
U.S. Appl. No. 14/249,665, the Office Actions dated May 16, 2016 and Feb. 22, 2017; and the Notice of Allowance dated Jun. 2, 2017.
U.S. Appl. No. 14/509,700, now U.S. Pat. No. 9,792,957, the Office Action dated Oct. 28, 2016; and the Notice of Allowance dated Jun. 15, 2017.
U.S. Appl. No. 14/534,626, the Office Actions dated Nov. 25, 2015, Jul. 5, 2016, Jun. 5, 2017 and Mar. 2, 2018.
U.S. Appl. No. 14/700,845, the Office Actions dated May 20, 2016, Dec. 2, 2016, May 22, 2017, Nov. 28, 2017 and Jun. 27, 2018.
U.S. Appl. No. 14/700,862, now U.S. Pat. No. 9,672,868, the Office Action dated Aug. 26, 2016; and the Notice of Allowance dated Mar. 9, 2017.
U.S. Appl. No. 14/835,857, the Office Actions dated Sep. 23, 2016, Jun. 5, 2017 and Aug. 9, 2018, and Advisory Action dated Oct. 20, 2017.
U.S. Appl. No. 14/978,464, the Office Actions dated Sep. 8, 2017 and May 18, 2018.
U.S. Appl. No. 14/978,491, the Office Actions dated Sep. 8, 2017 and May 25, 2018.
U.S. Appl. No. 15/085,209, the Office Action dated Feb. 26, 2018.
U.S. Appl. No. 15/189,931, the Office Action dated Apr. 6, 2018.

(56) References Cited

OTHER PUBLICATIONS

U.S. Appl. No. 15/863,191, the Notice of Allowance dated Jul. 5, 2018.

* cited by examiner

SYMBIOTIC INTERACTIVE VIDEO

CROSS-REFERENCE TO RELATED APPLICATION

This application claims priority to and the benefit of U.S. Provisional Patent Application No. 62/321,482, filed on Apr. 12, 2016, the entirety of which is incorporated by reference herein.

FIELD OF THE INVENTION

The present disclosure relates generally to streaming video and, more particularly, to systems and methods for dynamically and graphically integrating one video into another such that the videos appear related to or integrated with each other.

BACKGROUND

Various options exist to combine secondary content, such as advertisements, with primary content, such as streaming online video clips, episodes, and movies. For example, instream video ads, such as pre-rolls, mid-rolls, and post-rolls, can precede, interrupt, or follow primary video content. Overlay ads, such as banners, can be superimposed on primary video content while it is playing, but generally hide some or all of the primary content. Companion ads, on the other hand, are displayed in areas surrounding the primary video content and do not disrupt it. As another example, ads can be combined with primary content through product placement, where visual or other references are made to advertised products in the primary content.

SUMMARY

Systems and methods for providing symbiotic media content are described. In one aspect, a computer-implemented method includes receiving one or more advertising units at a user device, with each advertising unit including advertising video content. Primary video content is presented to a user of the user device and, during playback of the primary video content, a time at which advertising video content can be presented to the user is determined. At or before the determined time, user interface controls are displayed, each being associated with an advertising unit. An interaction with a first one of the user interface controls is received, and a symbiotic video is created by dynamically combining the primary video content with first advertising video content of the advertising unit associated with the first user interface control. The symbiotic video is presented to the user and, following the conclusion of the symbiotic video, the primary video content alone continues playback.

In one implementation, the combination is performed by graphically integrating at least a portion of the primary video content into the first advertising video content while at least one of the primary video content and the first advertising video content is playing. The advertising unit associated with the first user interface control can also include metadata defining location and timing information that define how to integrate the primary video content into the first advertising video content. This location and timing information can include a definition of an area within the first advertising video content into which the primary video content can be integrated into the first advertising video content at a particular time. The graphical integration can be performed by graphically manipulating the primary video content during playback of the first advertising video content based on the metadata. In another implementation, the combination is performed by graphically integrating the first advertising video content into the primary video content while at least one of the first advertising video content and the primary video content is playing.

The present aspect can also include one or more of the following features. The advertising unit associated with the first user interface control includes metadata defining the first user interface control. The first advertising video content and at least a portion of the primary video content are presented simultaneously to the user. The user interface controls are displayed at a predefined time. Playback of at least a portion of the primary video content is looped until the user interacts with at least one of the user interface controls.

Other aspects of the inventions include corresponding systems and computer-readable media. The various aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

The present disclosure describes, in various implementations, a creative integration of two or more sources of media content. In one example, primary video content and secondary video content, e.g., a video advertisement, are combined such that the primary video content becomes an integral part of the secondary video content. Different sources of media content can be automatically combined to create a "symbiotic" relationship among them. In other words, the sources of media content can mesh together or interact with each other in a unidirectional or bidirectional fashion. In the case of symbiotic advertisement integration, the user may become aware that he is viewing an ad, but simultaneously will remain connected to the primary content.

Advantageously, and in contrast to instream video ads, symbiotic advertisements need not occupy all or a large portion of a user's screen but, instead, are incorporated into primary video content (or primary video content is incorporated into the video advertisements) such that, for example, the ad moves with or otherwise interacts with the video content, the ad is dynamically positioned on in a static or moving ad area in the content (such as a video of a mobile device screen, television, etc.), or some other form of content integration occurs. Likewise, in contrast to product placements, symbiotic ads need not be an actual part of (e.g., encoded with) the primary content, nor do they need to be associated with specific locations and times in the primary content; rather, a symbiotic ad can be a separate component that is dynamically added to the primary content. Symbiotic ads can be any length and, in some instances, are relatively short (e.g., less than five seconds) to avoid interrupting the flow of any primary content.

Figure 1:
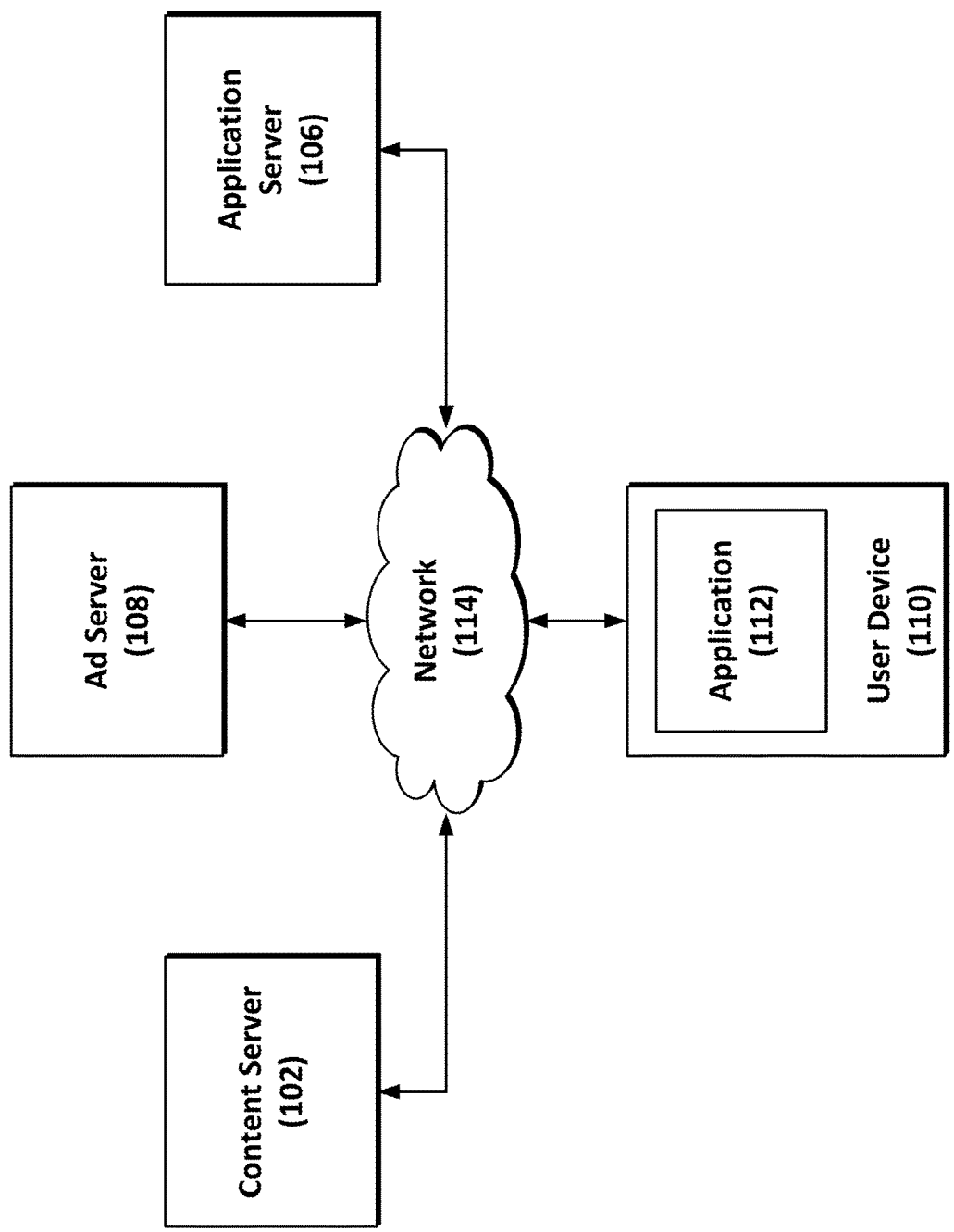
FIG. 1 depicts a high-level system architecture according to an implementation.

FIG. 1 depicts an example system for providing symbiotic media content, according to an implementation. A media presentation having multiple video and/or audio streams can be presented to a user on a user device 110 having an application 112 capable of playing and/or editing the content. The user device 110 can be, for example, a smartphone, tablet, laptop, palmtop, wireless telephone, television, gaming device, virtual reality headset, music player, mobile telephone, information appliance, workstation, a smart or dumb terminal, network computer, personal digital assistant, wireless device, minicomputer, mainframe computer, or other computing device, that is operated as a general purpose computer or a special purpose hardware device that can execute the functionality described herein. The user device 110 can have output functionality (e.g., display monitor, touchscreen, image projector, etc.) and input functionality (e.g., touchscreen, keyboard, mouse, remote control, etc.).

The application 112 can be a video player and/or editor that is implemented as a native application, web application, or other form of software. In some implementations, the application 112 is in the form of a web page, widget, and/or Java, JavaScript, .Net, Silverlight, Flash, and/or other applet or plug-in that is downloaded to the user device 110 and runs in conjunction with a web browser. The application 112 and the web browser can be part of a single client-server interface; for example, the application 112 can be implemented as a plugin to the web browser or to another framework or operating system. Any other suitable client software architecture, including but not limited to widget frameworks and applet technology can also be employed.

Primary media content can be provided to the user device 110 by content server 102, which can be a web server, media server, a node in a content delivery network, or other content source. The system can also include an ad server 108, which can provide advertising media content to the user device 110 in conjunction with the primary media content. In some implementations, the application 112 (or a portion thereof) is provided by application server 106. For example, some or all of the described functionality of the application 112 can be implemented in software downloaded to or existing on the user device 110 and, in some instances, some or all of the functionality exists remotely. For example, certain video encoding and processing functions can be performed on one or more remote servers, such as application server 106. In some implementations, the user device 110 serves only to provide output and input functionality, with the remainder of the processes being performed remotely.

User device 110, content server 102, application server 106, and ad server 108 can perform their respective functions using suitable hardware and/or software and, for example, can execute software on one or more custom operating systems or commercial operating systems such as the Microsoft Windows® operating systems, the Apple OS X® operating systems, the Apple iOS® platform, the Google Android™ platform, the Linux® operating system and other variants of UNIX® operating systems, and the like. Suitable hardware can include a computing device in the form of a computer including one or more processing units, system memory, and a system bus that couples various system components including the system memory to the processing unit(s). One or more software modules stored in system memory and executed on one or more processing units can be in the form of a suitable programming language, which is converted to machine language or object code to allow the processing unit(s) to read the instructions. Software executed by the system can be in the form of one or more standalone applications, and implemented in any suitable programming language or framework.

The user device 110, content server 102, application server 106, ad server 108, and/or other devices and servers can communicate with each other through communications network 114. The communication can take place via any media such as standard telephone lines, LAN or WAN links (e.g., T1, T3, 56kb, X.25), broadband connections (ISDN, Frame Relay, ATM), wireless links (802.11, Bluetooth, GSM, CDMA, etc.), and so on. The network 114 can carry TCP/IP protocol communications and HTTP/HTTPS requests made by a web browser, and the connection between clients and servers can be communicated over such TCP/IP networks. The type of network is not a limitation, however, and any suitable network can be used.

More generally, method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

Figure 2:
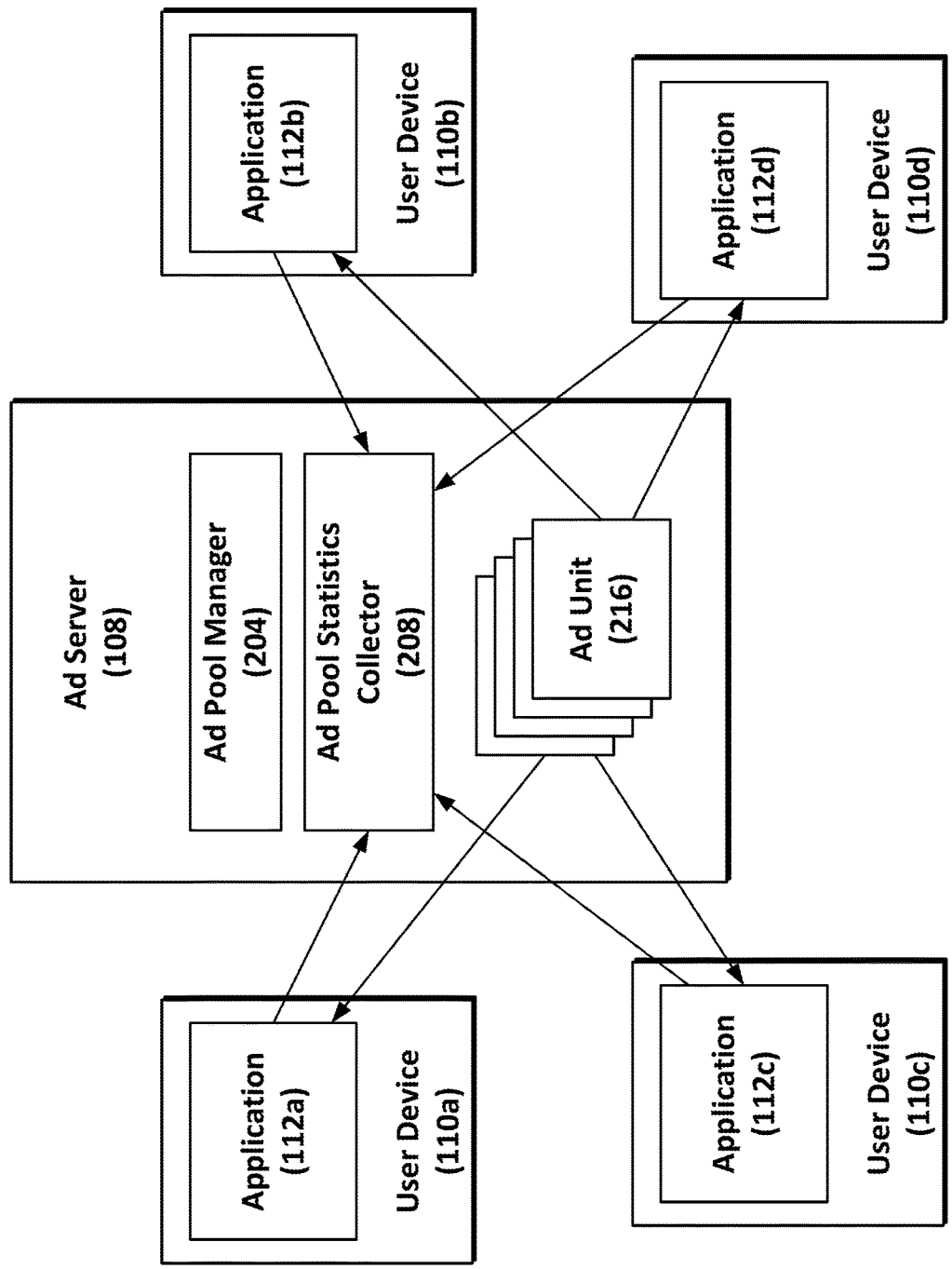
FIG. 2 depicts a high-level system architecture including the ad server of FIG. 1.

FIG. 2 depicts communication between ad server 108 and one or more user devices 110a-110d respectively executing applications 112a-112d, according to an implementation. For example, when a user views media content on user device 110a, and prior to playing advertising content, application 112a can make a request to ad server 108 (which can include one or more related or unrelated ad servers) to be provided with advertising content from a pool of advertising units 216. In response, ad pool manager 204 provides over a network, to application 112a on user device 110a, one or more advertising units 216.

Ad pool manager 204 can select which advertising units 216 to send to a particular user device 110a-110d by various known techniques (e.g., targeted advertising). In other implementations, ad pool manager 204 can use one or more of the following to determine which advertising units 216 to send to a user device 110a-110d: primary content or advertising content type (e.g., if the user is watching content for an adult audience, send advertising units associated with liquor advertising content), advertising unit type (e.g., if the user is watching content that lends itself to including user interface controls, send advertising units having interface controls defined therein), user information (e.g., send advertising content for new release movies if the user is known to have an interest in cinema), time/location information (e.g., send different advertising units depending on the current time and/or location associated with the user or the user device 110a-110d), and statistics collected by ad pool statistics collector 208 (e.g., send advertising units 216 that were popular with other users). Ad server 108 can also send different advertising units 216 for the same marketing campaign. Advertising units 216 can be received by different applications 112a-112d on different devices 110a-110d that are displaying different media content to different users, all in parallel or at different times. Further, users viewing different media content can be shown advertising content from the same pool of advertising units 216 managed by the ad server 108.

In one implementation, an advertising unit 216 is a data structure or other container including advertising content or a reference (e.g., uniform resource locator) to advertising content. The advertising content can include various forms of media, including video, audio, text, images, and any combination of the foregoing. In the case of video content, for example, the advertising content can include a defined area where the primary media content is located or superimposed during playback of the ad. The defined area can be, for example, a solid green or blue area that allows for green/blue-screen compositing of the primary and advertising content.

Advertising units 216 can also include metadata including information describing how to manipulate the primary content in order to incorporate the advertising content (or to manipulate the advertising content to incorporate the primary content, or both). The metadata can include, for example, location-based and time-based information, such as coordinates (e.g., x, y locations of where particular content should be positioned on a canvas) and timestamps (e.g., time values with reference to the playback timeline of the primary or advertising content, and associated with the location-based information). The metadata can also include information defining an area into which the primary content can be inserted or overlaid. For example, the location information can define a rectangular area, and the primary content be resized in order to fit into the defined area. Together, the location- and time-based information can inform the playing application 112a, 112b, 112c, or 112d how to graphically integrate and manipulate the advertising and/or primary content dynamically during playback.

Advertising units 216 can further include information defining one or more user interface controls or elements to be associated with the advertising content. For example, an advertising unit 216 can include information defining a button that a user can tap or click. The button can be defined using location-based information (e.g., coordinates where to position the button on a display canvas), time-based information (e.g., timestamps defining when the button should appear and disappear), and content (e.g., an image or video clip, or reference thereto, representing the button). Other interface controls are contemplated, including graphical controls that respond to user interaction, visible or hidden controls that respond to a user's voice, and so on. A user interface control included in an advertising unit 216 can be associated with the advertising unit 216 such that, when a user interacts with the control, the advertising content is shown to the user at that time or at a later time.

Ad pool statistics collector 208 can receive data regarding advertising units from applications 112a-112d on respective user devices 110a-110d. For example, ad pool statistics collector 208 can collect data indicating which advertising units were selected and sent by ad pool manager 204 to user devices 110a-110d, which advertisements were selected and/or presented to users (e.g., views), what interactions were made with the advertisements by users (e.g., clicks, link selections), and other events and actions, such as conversions (e.g., sign-ups, purchases, etc., resulting from an advertisement). As noted above, the statistics collected by ad pool statistics collector 208 can be used in determining which advertising units 216 should be selected and sent by ad pool manager 204 to user devices 110a-110d. The statistics (e.g., views, clicks, actions) can be used to determine how to charge the advertiser whose advertisement was shown or interacted with.

Figure 3:
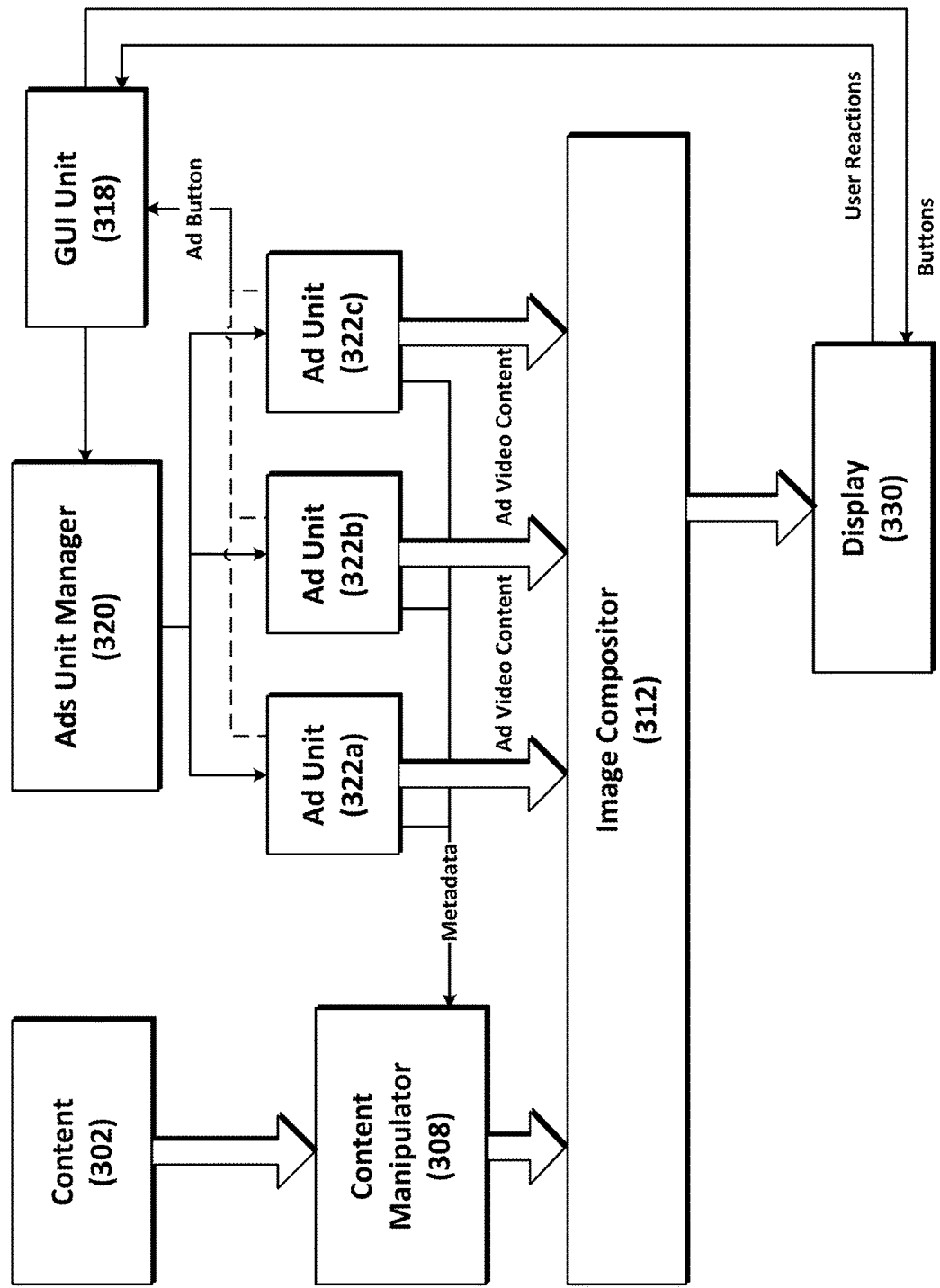
FIG. 3 depicts a high-level system architecture of the application of FIG. 1.

Referring now to FIG. 3, in one implementation, application 112 includes a video player that incorporates functionality for providing symbiotic media content. The video player includes content manipulator 308, image compositor 312, GUI unit 318, and ad unit manager 320, as well as functionality to present media content to a user (e.g., standard techniques for audio/video playback). As earlier described, advertising units 322a-322c can be received from an ad server 108. Graphical user interface (GUI) unit 318 receives GUI (e.g., user interface control) information, if any, from one or more of the advertising units 322a-322c, for presentation to the user. For example, a particular advertising unit 322a, 322b, or 322c can include information defining a button that, if interacted with by the user, results in the presentation of advertising content associated with that advertising unit 322a, 322b, or 322c. GUI unit 318 can further send user interface controls for drawing to the video player display window 330 on, for example, a layer superimposed over playing video content.

Accordingly, upon identifying a user interaction with a user interface control associated with an advertising unit 322a, 322b, or 322c, GUI unit 318 notifies ads unit manager 320 of the interaction. Based on this notification, ads unit manager 320 determines which advertising unit 322a, 322b, or 322c to use (e.g., the advertising unit that is associated with the user interface control with which the user interacted) for presenting advertising content to the user. In some instances, the ad units manager 320 has multiple relevant advertising units 322a-322c to select from for a particular user interaction. For example, if the user interacts with a user interface control (e.g., selects an advertisement) associated with "beer," and there are multiple advertising units 322a-322c associated with a beer marketing campaign, the ad unit manager 320 can select between the two or more advertising units 322a-322c from that campaign. In this manner, the video player can provide different ads although the user selects the same ad option.

Content manipulator 308 receives primary media content 302 (e.g., over a network from content server 102) and manipulates the primary media content 302 so that it can be incorporated into advertising content (and/or to allow advertising content to be incorporated into the primary media content 302). As described above, information defining how to manipulate content for a particular advertisement can be included as metadata for the respective advertising unit 322a, 322b or 322c. As one example, content manipulator 308 can resize (e.g., grow or shrink) content, rotate it, and position it on a mobile device screen of a person drinking a Coke® in a video ad. Other forms of manipulation of primary media content and advertising content are contemplated, and can include zoom in, zoom out, rotate, tilt, skew, grow, shrink, mask all or a portion of content, change color or contrast, divide into smaller components, and any other form of image and video manipulation. In some instances, manipulation of content is performed using functions available through the WebGL (Web Graphics Library) application programming interface.

Image compositor 312 receives manipulated content from content manipulator 308 and composites, or combines, the manipulated content with advertising content from the advertising unit 322a, 322b, or 322c selected by ads unit manager 320. In one implementation, the combination is performed by copying into a canvas (e.g., a data structure holding graphical information to draw to display 330) the advertising content and the manipulated content over the advertising content. For standard playback of primary media content (i.e., playback without advertising content), the primary media content is sent directly for drawing to the display 330, and no manipulation as described need occur.

Figure 4:
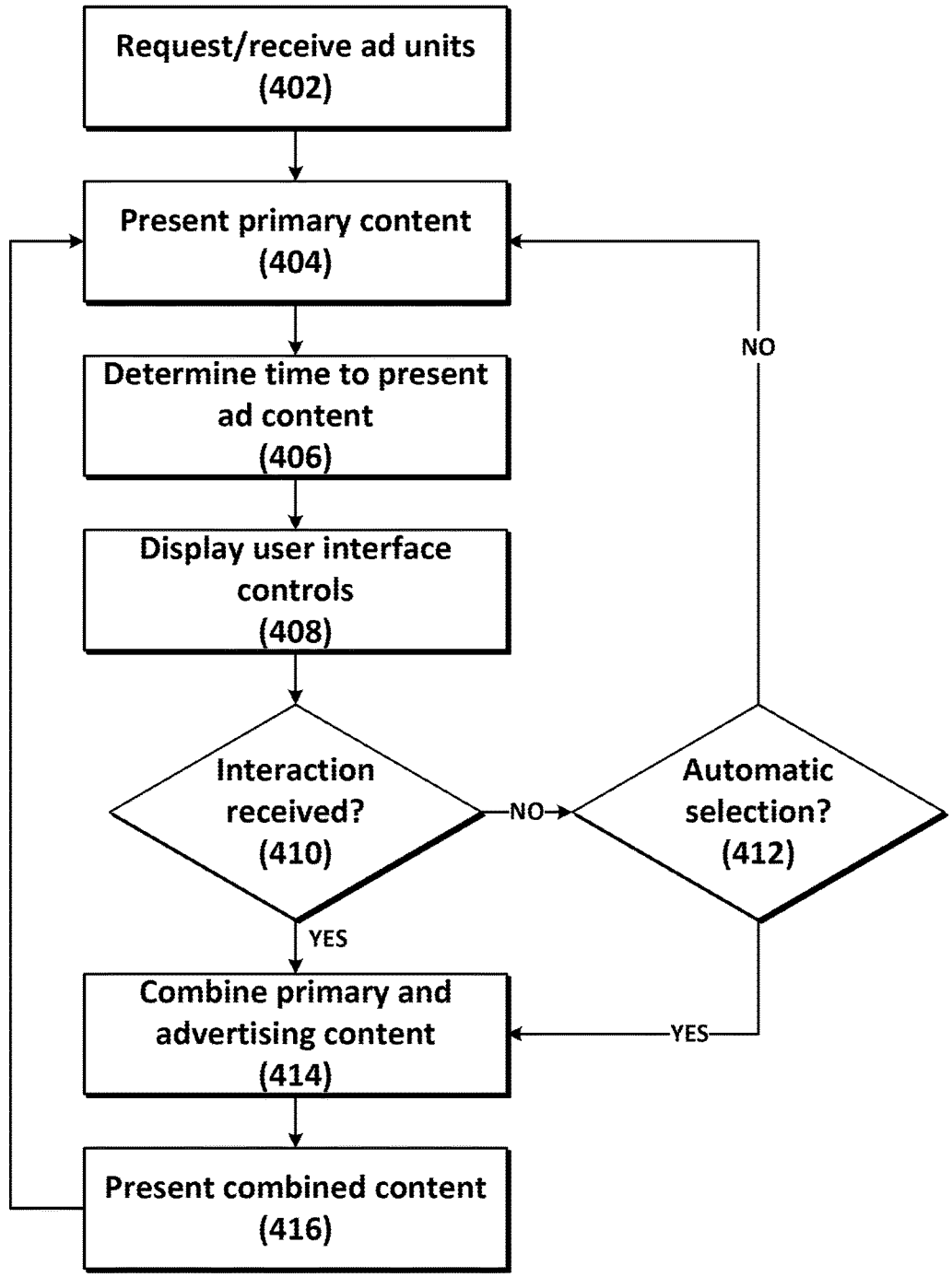
FIG. 4 depicts a method for providing a symbiotic video, according to an implementation.

With reference to the system implementations described herein, FIG. 4 depicts an example method for providing a symbiotic video to a user. In STEP 402, ads unit manager 320 in application 112 on user device 110 requests advertising content from ad server 108, which responds by having ad pool manager 204 select and provide advertising units 216 to the application 112. The foregoing step can occur prior to playing any media content, or can occur during the playback of media content (e.g., prior to reaching a point where an ad can be inserted). Once the primary media content is playing (STEP 404), the video player identifies an appropriate time when an advertisement can be presented (STEP 406). The time can be, for example, a random time, the beginning of the primary content, the end of the primary content, a predefined time in the content, a time when content is idle or there is less action or interesting content (e.g., between songs, between scenes, between the opening title and beginning of a movie or show), and so on.

In STEP 408, the GUI unit 318 directs the user interface control(s) (e.g., button(s)) associated with one or more of the advertising units to be drawn to the display 330. The user interface control(s) allow the user to decide if an advertisement will be shown and, in some cases, what the advertisement will be. If the user does not interact with a displayed user interface control (e.g., to select an advertisement to play) and if no automatic selection of an advertisement is made (STEPS 410 and 412), playback of the primary content continues without interruption (return to STEP 404). If, on the other hand, a user interaction with an interface control is received or, if no interaction is received but a selection is automatically made (STEPS 410 and 412), the method continues to STEP 414, in which advertising content and the primary video content is combined.

In some implementations, no user interface controls are shown, and an advertisement is automatically selected for playback. In other implementations, user interface controls are displayed some or all of the time to allow the user to select an advertisement. The primary content can be paused or a portion of the primary content can be looped while waiting for the user to interact with a control. The pause/loop can continue indefinitely, or can timeout after a certain period, after which either an automatic ad selection or no selection is made. There can be requirements defined by, for example, the primary content provider that allow the user to start or continue watching the primary content only by watching one or more advertisements at a particular time or over a particular time period. As one example, the user can be required to watch at least two ads per ten minutes of primary content, but the user is permitted to watch the ads at any time or at predefined time periods during playback of the primary content. The user can also be provided with compensation (other than being permitted to view primary content) if he chooses to view advertising content. Such compensation can include, but is not limited to, discounts on or gifts of goods and services, coupons, and the like.

More specifically, in STEP 414, metadata associated with the selected advertising unit is received by content manipulator 308, which uses the metadata (e.g., time and location information) to determine how to combine the primary content and advertising content. Image compositor 312 then integrates the primary content into the advertisement (or vice-versa). In STEP 416, the combined content is presented to the user and, after completion or termination (e.g., skipping), playback of the primary content alone continues (return to STEP 404).

Figure 5A:
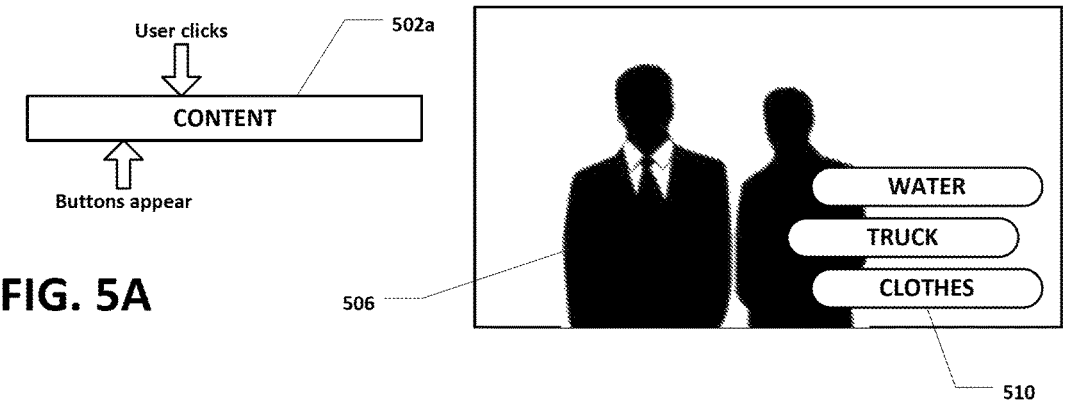
FIGS. 5A-5C depict screen displays and corresponding timelines for an example symbiotic video.
Figure 5B:
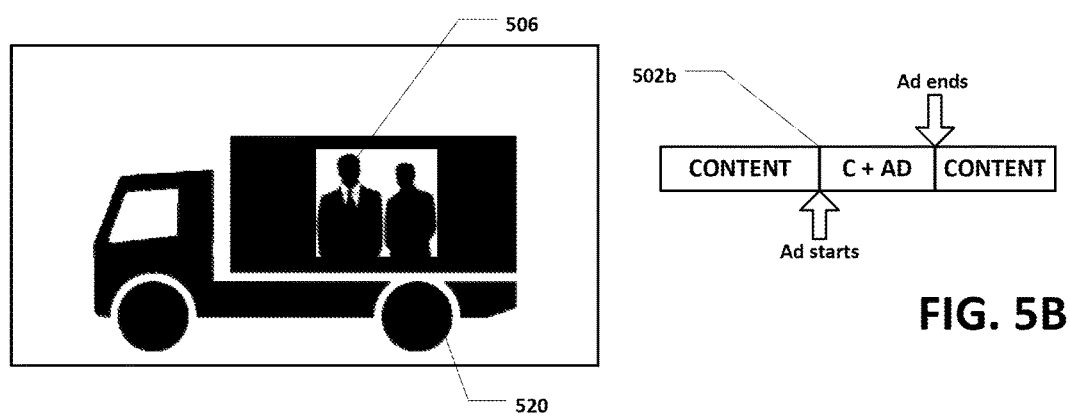
Figure 5C:
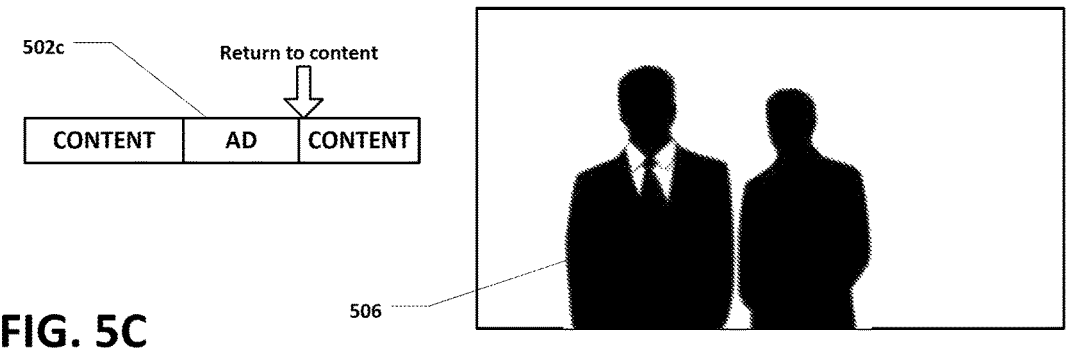

FIGS. 5A-5C depicts an example presentation of a symbiotic video created using system and methods as described herein. Referring to FIG. 5A, timeline 502a corresponds with the playback of primary video content 506 to a user. At a first point in time during the playback, a set of user interface controls (i.e., buttons 510) is displayed to the user and overlays the video content 506. The three buttons 510 correspond to three different advertisements that can be shown to the user: an ad associated with a "water" product, an ad associated with a "truck", and an ad associated with "clothes". At a second, later point in the timeline 502a, the user interacts with the "truck" button, selecting that advertisement for presentation. The ad can be shown immediately upon the users interaction, or some time thereafter.

In FIG. 5B, as shown in timeline 502b, after the user interaction with the "truck" button, the combined content and advertisement (C+ad) is presented to the user. Graphically, the video smoothly transitions to the ad video content 520 by, for example, zooming away from the primary content 506, resulting in the primary content 506 being shown on the side of a truck in the ad video content 520. The primary content 506 can continue to play during presentation of the ad video content 520, or it can be paused, slowed, hidden, or looped. Audio associated with the primary content can also be muted or reduced in volume during this time.

The primary content 506 and ad video content 520 can be symbiotic; for example, the primary content 506 can continue to be shown on the same position on the truck as it drives across the user's display. Ultimately, the effect is that the primary content 506 is integrated into the ad video content 520 as if the two were a single video. Following completion of playback of the combined content, as shown by timeline 502c in FIG. 5C, playback returns to the primary content 506. In one instance, to effect a smooth transition back to the primary content 506 from the combined content, the user's view can zoom in on the truck until the primary content 506 occupies the entire display.

Figure 6:
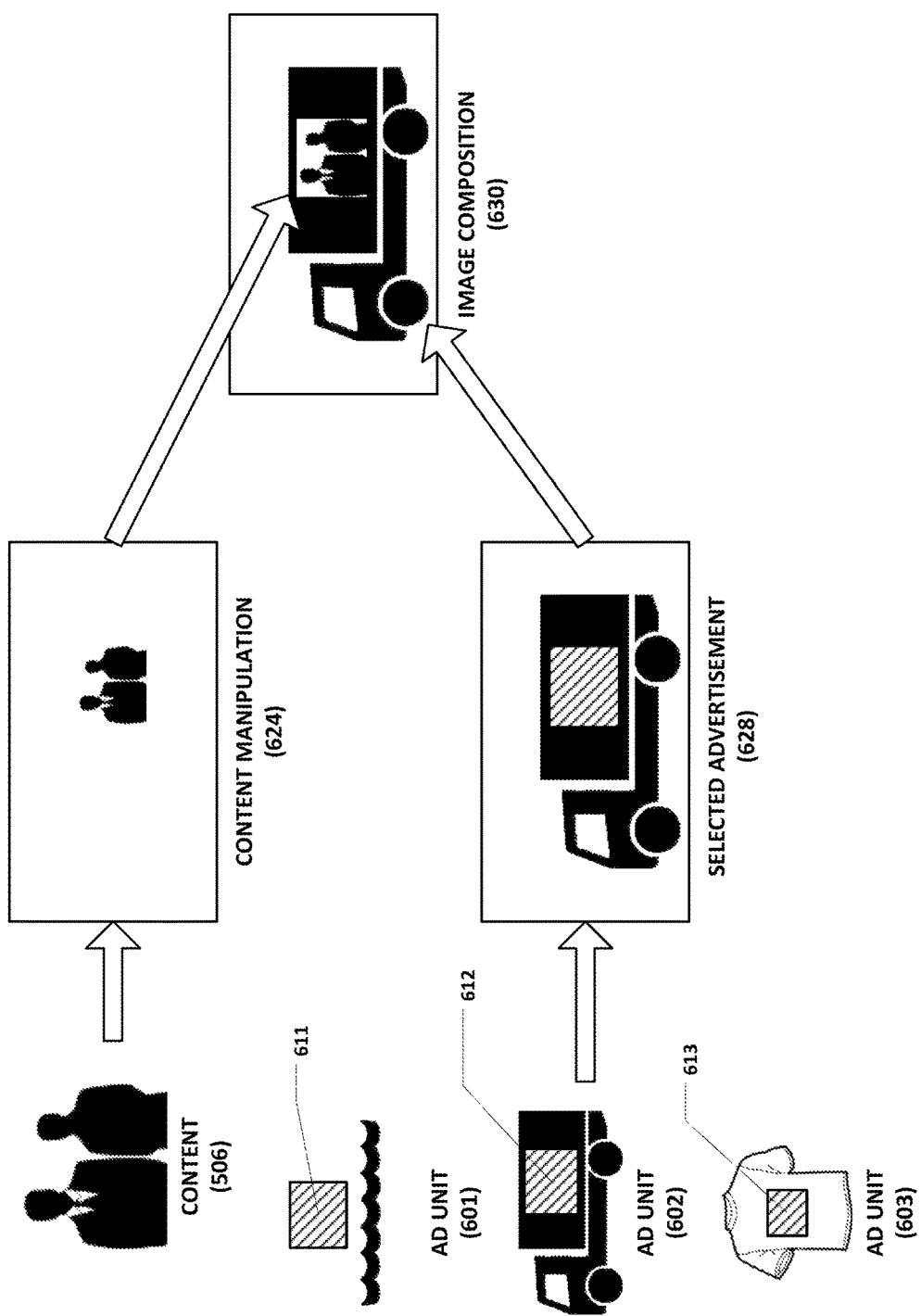
FIG. 6 depicts a high-level process for creating the symbiotic video of FIGS. 5A-5C.

FIG. 6 provides further detail on the creation of the symbiotic video depicted in FIGS. 5A-5C. The buttons 510 depicted in FIG. 5A respectively correspond to the three different advertising units 601-603 in FIG. 6, each having associated advertising video content (water, truck, and clothes). Each advertising unit 601-603 also has a respective defined area 611-613 into which primary video content is integrated or overlaid. These areas 611-613 can be transparent or in solid colors (e.g., the same green used in green screens), for example. The defined areas 611-613 can take the form of different shapes and sizes (e.g., circle, triangle, scattered, inside water, in a mirror, as a drawing, or in any other way). Defined areas 611-613 can also change position, size, shape, and so on, as the ad content and/or primary content is playing.

With reference as well to FIG. 3, upon GUI unit 318 receiving an interaction with the "truck" button (or upon an automatic selection of the "truck" ad), advertising unit 602 is selected by ads unit manager 320. Metadata associated with advertising unit 602 is then used for content manipulation 624 (e.g., by content manipulator 308), which, in this instance, involves resizing and positioning the content 506 so that it will fit in and be aligned with the defined area 612 in the truck advertising video content. Image composition 630 is then performed (e.g., by image compositor 312) to combine the selected advertisement 628 and the manipulated primary content. Note that the content manipulation 624 and image composition 630 processes can be continuously performed as the advertising content and/or video content is playing, to provide for dynamic manipulation of the content as needed (e.g., to reposition, resize, or otherwise manipulate ad and/or video content to make them seamlessly fit together, as well as to allow for a smooth transition into and out of the advertising content).

One of ordinary skill in the art will appreciate the virtually endless uses to which the techniques described herein can be applied. Examples of such use cases will now be described.

Cola advertisement: Following the selection of an advertisement during the playback of primary video content, the primary video content zooms out, and the user sees a man watching the content on his smartphone while sitting on a bench drinking the advertised soft drink. The primary video content can continue to play, muted, on the smartphone. Shortly thereafter (e.g., 3-5 seconds), the display zooms back into the primary video content, slowly increasing the volume of the audio associated with the content, until it occupies the full display. Playback of the primary content alone then continues.

Bus company advertisement: Following the selection of an advertisement during the playback of primary video content, the primary video content pauses and zooms out, and the user sees that the content is a graphic plastered on the side of a bus. The bus, which prominently displays the name and logo of the advertising bus company, drives by and disappears, a new bus arrives with the same graphic, the display zooms in on the graphic, and the primary video content resumes.

Vacuum cleaner advertisement: While a user is watching primary video content, the screen appears to crack, and then breaks into many pieces. An advertised vacuum cleaner collects the pieces, a new screen is drawn, and the primary video content continues.

Crayon advertisement: The primary video content transforms into the drawing of a young child. The child erases the drawing, then draws a new picture with an advertised crayon. The advertisement ends when the new picture is transformed into new primary video content, which then continues playback.

No primary content audio: The display zooms out from primary video content, showing an advertisement for beer occurring in a pub scene. The primary content continues to be shown on a television in the pub, but the audio of the primary content is muted in favor of the audio from the advertisement. During playback of the advertisement, the user can interact with the ad (e.g., by clicking or touching a beer can) and, on doing so, the ad is paused and a new window displaying content (e.g., website) associated with the beer appears. On completion of the beer advertisement, the display zooms in on the television until the primary content fills the entire screen. The primary content its audio at full volume then resumes.

Only audio: In starting a video public service ad for recycling, the primary video content graphically transforms into a piece of paper, which is crumpled up and tossed into a trashcan. The primary video content has disappeared, but the audio for the primary content continues through the ad. Video is then shown of an envelope arriving and, upon opening the envelope, a piece of paper displaying new primary content is shown. The new primary content video then continues on from this point.

Although the systems and methods described herein relate primarily to audio and video presentation, the invention is equally applicable to various streaming and non-streaming media, including animation, video games, interactive media, and other forms of content usable in conjunction with the present systems and methods. Further, there can be more than one audio, video, and/or other media content stream played in synchronization with other streams. Streaming media can include, for example, multimedia content that is continuously presented to a user while it is received from a content delivery source, such as a remote video server. If a source media file is in a format that cannot be streamed and/or does not allow for seamless connections between segments, the media file can be transcoded or converted into a format supporting streaming and/or seamless transitions.

While various implementations of the present invention have been described herein, it should be understood that they have been presented by example only. Where methods and steps described above indicate certain events occurring in certain order, those of ordinary skill in the art having the benefit of this disclosure would recognize that the ordering of certain steps can be modified and that such modifications are in accordance with the given variations. For example, although various implementations have been described as having particular features and/or combinations of components, other implementations are possible having any combination or sub-combination of any features and/or components from any of the implementations described herein.

The invention claimed is:

1. A computer-implemented method comprising:

presenting a primary video including primary video content to a user of a user device;

determining, via the user device, at least one user attribute of the user, wherein the at least one user attribute is based at least in part on a location of the user device;

transmitting the at least one user attribute from the user device to an advertising management device;

automatically selecting, via the advertising management device, a plurality of advertising units based on the at least one user attribute, each advertising unit comprising advertising video content and integration metadata for integrating the advertising video content with the primary video content;

receiving at the user device the selected plurality of advertising units from the advertising management device;

identifying a pre-determined window during playback of the primary video at which first advertising video content associated with a first advertising unit can be presented to the user, the pre-determined window having a location in the primary video and a duration selected by a provider of the primary video, wherein the duration of the pre-determined window is less than a duration of the primary video;

displaying, before the pre-determined window, a plurality of user interface controls over the primary video, each user interface control being associated with a different advertising unit of the selected plurality of advertising units, wherein the plurality of user interface controls includes at least two different user interface controls associated with at least two different advertising units of the selected plurality of advertising units;

receiving, from the user, an interaction with one user interface control of the plurality of user interface controls;

automatically selecting the first advertising unit from the selected plurality of advertising units based on the interaction;

dynamically combining the primary video content with the first advertising video content associated with the first advertising unit to create a symbiotic video based on the integration metadata associated with the first advertising unit, wherein the combining comprises graphically integrating at least a portion of the primary video content into one or more spatially defined areas within the first advertising video content while the primary video content and/or the first advertising video content is playing;

transitioning, at a start of the pre-determined window, from the primary video to the symbiotic video based on the integration metadata, wherein the transitioning comprises reducing dimensions of the one or more spatially defined areas within the first advertising video content to create an appearance of zooming away from the primary video content while the first advertising video content simultaneously fills a display area that is being vacated by the primary video content;

presenting the symbiotic video to the user;

transitioning, at an end of the pre-determined window, from the symbiotic video back to the primary video based on the integration metadata, wherein transitioning back to the primary video comprises increasing dimensions of the one or more spatially defined areas within the first advertising video content to create an appearance of zooming in to the primary video content until the first advertising video content is no longer visible; and continuing presentation of the primary video to the user following the presentation of the symbiotic video.

2. The method of claim 1, wherein the integration metadata includes location and timing information defining how to integrate the primary video content into the first advertising video content.

3. The method of claim 2, wherein the location and timing information comprises a definition of an area within the first advertising video content into which the primary video content can be integrated into the first advertising video content at a particular time.

4. The method of claim 2, wherein the graphically integrating comprises graphically manipulating the primary video content during playback of the first advertising video content based on the metadata.

5. The method of claim 1, wherein the first advertising video content and at least a portion of the primary video content are presented simultaneously to the user.

6. The method of claim 1, wherein the integration metadata includes information defining at least one user interface control associated with the first advertising unit.

7. The method of claim 1, further comprising looping playback of at least a portion of the primary video content until the user interacts with at least one user interface control of the plurality of user interface controls.

8. The method of claim 1, wherein the graphically integrating comprises displaying at least the portion of the primary video content on a physical object depicted in the first advertising video content.

9. The method of claim 8, wherein the physical object is in motion during at least part of a duration of the first advertising video content, the method further comprising graphically manipulating at least the portion of the primary video content during at least the part of the duration of the first advertising video content to correspond to movement of the physical object during at least the part of the duration.

10. The method of claim 1, wherein presenting the symbiotic video comprises playing first advertising audio content associated with the first advertising video content for a another period of time while muting the audio associated with the primary video content.

11. The method of claim 1, wherein presenting the symbiotic video comprises:

presenting a portion of the primary video content that is slowed or looped.

12. The method of claim 1, wherein transitioning from the primary video to the symbiotic video based on the integration metadata further comprises reducing a volume of audio associated with the primary video content, and wherein transitioning from the symbiotic video back to the primary video based on the integration metadata further comprises increasing the volume of the audio associated with the primary video content.

13. A system comprising:

at least one memory storing computer-executable instructions; and at least one processor for executing the instructions stored on the memory, wherein execution of the instructions programs the at least one processor to perform operations comprising:

presenting a primary video including primary video content to a user of a user device;

determining, via the user device, at least one user attribute of the user, wherein the at least one user attribute is based at least in part on a location of the user device;

transmitting the at least one user attribute from the user device to an advertising management device;

automatically selecting, via the advertising management device, a plurality of advertising units based on the at least one user attribute, each advertising unit comprising advertising video content and integration metadata for integrating the advertising video content with the primary video content;

receiving at the user device the selected plurality of advertising units from the advertising management device;

identifying a pre-determined window during playback of the primary video at which first advertising video content associated with a first advertising unit can be presented to the user, the pre-determined window having a location in the primary video and a duration selected by a provider of the primary video, wherein the duration of the pre-determined window is less than a duration of the primary video;

displaying, before the pre-determined window, a plurality of user interface controls over the primary video, each user interface control being associated with a different advertising unit of the selected plurality of advertising units, wherein the plurality of user interface controls includes at least two different user interface controls associated with at least two different advertising units of the selected plurality of advertising units;

receiving, from the user, an interaction with one user interface control of the plurality of user interface controls;

automatically selecting the first advertising unit from the selected plurality of advertising units based on the interaction;

dynamically combining the primary video content with the first advertising video content associated with the first advertising unit to create a symbiotic video based on the integration metadata associated with the first advertising unit, wherein the combining comprises graphically integrating at least a portion of the primary video content into one or more spatially defined areas within the first advertising video content while the primary video content and/or the first advertising video content is playing;

transitioning, at a start of the pre-determined window, from the primary video to the symbiotic video based on the integration metadata, wherein the transitioning comprises reducing dimensions of the one or more spatially defined areas within the first advertising video content to create an appearance of zooming away from the primary video content while the first advertising video content simultaneously fills a display area that is being vacated by the primary video content;

presenting the symbiotic video to the user;

transitioning, at an end of the pre-determined window, from the symbiotic video back to the primary video based on the integration metadata, wherein transitioning back to the primary video content comprises increasing dimensions of the one or more spatially defined areas within the first advertising video content to create an appearance of zooming in to the primary video content until the first advertising video content is no longer visible; and continuing presentation of the primary video to the user following the presentation of the symbiotic video.

14. The system of claim 13, wherein the integration metadata includes location and timing information defining how to integrate the primary video content into the first advertising video content.

15. The system of claim 14, wherein the location and timing information comprises a definition of an area within the first advertising video content into which the primary video content can be integrated into the first advertising video content at a particular time.

16. The system of claim 14, wherein the graphically integrating comprises graphically manipulating the primary video content during playback of the first advertising video content based on the metadata.

17. The system of claim 13, wherein the first advertising video content and at least a portion of the primary video content are presented simultaneously to the user.

18. The system of claim 13, wherein the integration metadata includes information defining at least one first user interface control associated with the first advertising unit.

19. The system of claim 13, wherein the operations further comprise looping playback of at least a portion of the primary video content until the user interacts with at least one user interface control of the plurality of user interface controls.

20. The system of claim 13, wherein presenting the symbiotic video comprises playing first advertising audio content associated with the first advertising video content for a another period of time while muting the audio associated with the primary video content.

21. The system of claim 13, wherein presenting the symbiotic video comprises:
presenting a portion of the primary video content that is slowed or looped.

22. The system of claim 13, wherein transitioning from the primary video to the symbiotic video based on the integration metadata further comprises reducing a volume of audio associated with the primary video content, and
wherein transitioning from the symbiotic video back to the primary video based on the integration metadata further comprises increasing the volume of the audio associated with the primary video content.

* * * * *